US012011620B2

(12) United States Patent
Bourque

(10) Patent No.: US 12,011,620 B2
(45) Date of Patent: Jun. 18, 2024

(54) PORTABLE SMOKE AND FIRE PROTECTION DEVICE AND METHODS RELATING TO SAME

(71) Applicant: Éric Bourque, Rouyn-Noranda (CA)

(72) Inventor: Éric Bourque, Rouyn-Noranda (CA)

(73) Assignee: Eric Bourque, Quebec (CA)

( * ) Notice: Subject to any disclaimer, the term of this patent is extended or adjusted under 35 U.S.C. 154(b) by 879 days.

(21) Appl. No.: 17/077,846

(22) Filed: Oct. 22, 2020

(65) Prior Publication Data

US 2021/0038927 A1 Feb. 11, 2021

Related U.S. Application Data

(63) Continuation of application No. PCT/CA2019/050510, filed on Apr. 23, 2019.

(51) Int. Cl.
*A62B 17/04* (2006.01)
*A41D 13/002* (2006.01)
(Continued)

(52) U.S. Cl.
CPC .......... *A62B 17/04* (2013.01); *A41D 13/0025* (2013.01); *A62B 7/12* (2013.01);
(Continued)

(58) Field of Classification Search
CPC .... A62B 3/00; A62B 5/00; A62B 7/00; A62B 7/10; A62B 7/12; A62B 9/00; A62B 9/04;
(Continued)

(56) References Cited

U.S. PATENT DOCUMENTS 3,605,119 A 9/1971 Cherry
4,554,683 A * 11/1985 Wong .................... A62B 17/04 2/202
(Continued)

FOREIGN PATENT DOCUMENTS

EP 2700432 A1 * 2/2014 ............ A41D 13/02
FR 2657332 7/1991
KR 10-2013-0058290 6/2013

OTHER PUBLICATIONS

Examiner requisition dated Dec. 2, 2020 in corresponding Canadian Application 3098500.

*Primary Examiner* — Colin W Stuart
(74) *Attorney, Agent, or Firm* — Eugene F. Derenyi

(57) ABSTRACT

Disclosed is a device for protecting a user from smoke or fire, including a sealed dome-like cover. An opening provided in the cover front portion enables emergency oxygen to force smoke present under the cover to be expelled by positive air pressure through a space below the waist. The dome-like cover is overlaid from above the top of the head to at least the waist of the user and connected to a source of oxygen. The device is reversible so that it can also be used as a stretcher. The materials used enable use as a thermal blanket. The device can be provided compactly folded in a bag that can provide lumbar support thereby ensuring that miners will always carry the device with them. A step of vacuum sealing for a predetermined amount of time ensures malleability of the compact device for enhanced lumbar support and device longevity.

29 Claims, 13 Drawing Sheets

(51) Int. Cl.

| | |
|---|---|
| ***A62B 7/12*** | (2006.01) |
| *A61G 1/01* | (2006.01) |
| *A62B 25/00* | (2006.01) |
| *A62B 31/00* | (2006.01) |

(52) U.S. Cl.
CPC ................ *A61G 1/01* (2013.01); *A62B 25/00* (2013.01); *A62B 31/00* (2013.01)

(58) Field of Classification Search
CPC ......... A62B 13/00; A62B 15/00; A62B 17/00; A62B 17/001; A62B 17/003; A62B 17/006; A62B 17/04; A62B 25/00; A62B 31/00; A41D 13/00; A41D 13/0025; A41D 13/01; A41D 15/005; A41D 15/04; A41D 31/04; A41D 31/06; A41D 31/08; A41D 2200/10; A41D 2200/20; A41D 2300/32; A41D 2400/42; A41D 2400/422; A41D 2400/424; A41D 2400/48; A61G 1/01
See application file for complete search history.

(56) References Cited

U.S. PATENT DOCUMENTS

| | | | | | |
|---|---|---|---|---|---|
| 4,683,880 | A * | 8/1987 | Werjefelt | A62B 15/00 | 128/201.28 |
| 5,113,854 | A * | 5/1992 | Dosch | A62B 7/08 | 128/205.27 |
| 5,309,571 | A * | 5/1994 | Huang | A62B 17/003 | 2/84 |
| 5,370,113 | A * | 12/1994 | Parsons | A41D 15/04 | 128/202.19 |
| 5,442,821 | A * | 8/1995 | Weeks | A61G 1/01 | 5/89.1 |
| 5,628,066 | A * | 5/1997 | Gottlieb | A62B 17/003 | 2/84 |
| 5,884,760 | A | 3/1999 | Carpenter | | |
| 10,933,264 | B1 * | 3/2021 | Strouse | A62C 15/00 | |
| 2004/0206795 | A1 * | 10/2004 | Kang | A45F 4/02 | 224/576 |

* cited by examiner

PORTABLE SMOKE AND FIRE PROTECTION DEVICE AND METHODS RELATING TO SAME

CROSS-REFERENCE TO RELAYED APPLICATIONS

This application is related to, and claims priority from, United Kingdom patent application number GB1806714.0, entitled PORTABLE SMOKE AND FIRE PROTECTION DEVICE AND METHOD OF USING SAME, by Eric Bourque, filed Apr. 24, 2018. This application is related to, is a continuation of, and claims priority from, Patent Cooperation Treaty International Application No. PCT/CA2019/050510 entitled PORTABLE SMOKE AND FIRE PRO VECTION DEVICE AND METHOD OF USING SAME, by Eric Bourque, filed 23 Apr. 2019.

TECHNICAL FIELD

The present application relates generally to protection devices and, more particularly, to a portable smoke and fire protection device and methods relating to same.

BACKGROUND

Portable smoke and fire protection devices are known. Typically, such known protection devices of the prior art are generally represented by a flexible and fire resistant blanket having a bright coloured or light reflective exterior surface. The blanket is sufficiently sized and shaped to overlay a standing user and is storable in folded state in a portable re-closable pouch. The pouch being typically provided with a hook or shoulder strap to carry the device.

The blanket is generally represented in its simplest form, e.g. a flexible blanket that the user simply grabs by opposed side edges thereof and wraps himself or herself in while walking or running towards a safer location.

While these prior art protection devices can generally fulfil the main objective of providing basic fire and smoke protection to a user, they may also generally have significant shortcomings in accomplishing this same task, and other tasks.

SUMMARY

According to an aspect of the present application, there is provided: a device for protecting a user from smoke or fire. The device includes a sealed dome-like cover defining a cover interior for receiving the user, a cover apex for receiving the user's head, a cover bottom edge distally opposite the cover apex, a cover front portion and a cover rear portion opposite the cover back portion. The device further includes an opening provided in the cover front portion, sufficiently sized such that emergency oxygen received through the opening forces any smoke present under the cover to be expelled by positive air pressure through the space below the cover bottom edge.

According to an aspect of the present application, there is provided a method of use of the device. The method includes overlaying the dome-like cover over the user from above the top of the head of the user to at least the waist of the user. The method further includes connecting the opening provided in the front cover portion to a source of oxygen.

According to an aspect of the present application, there is provided a method of use of the device, the method comprising placing a first reversed dome-like cover under a victim proximate to one of the head and the feet of the victim; placing a second reversed dome-like cover under the victim proximate to the other of the head and the feet of the victim; grabbing the handles to lift the victim; and moving the victim to a safer location.

According to an aspect of the present application there is provided a method of use of the device, the method comprising a step of using the dome-like cover as a thermal blanket.

According to an aspect of the present application there is provided a method of use of the device, the method comprising a step of wearing the bag of the device as a lumbar support.

According to an aspect of the present application there is provided a method of manufacture of the device, the method comprising a step of vacuum sealing the vacuum seal bag for a predetermined amount of time.

Other aspects and features of the present application will become apparent to those ordinarily skilled in the art upon review of the following description of specific embodiments of a portable smoke and fire protection device and method in conjunction with the accompanying drawing figures.

BRIEF DESCRIPTION OF THE DRAWINGS

Embodiments of the present application will now be described, by way of example only, with reference to the accompanying drawing figures, wherein.

Like reference numerals are used in different figures to denote similar elements.

DETAILED DESCRIPTION OF THE DRAWINGS

Figure 1:
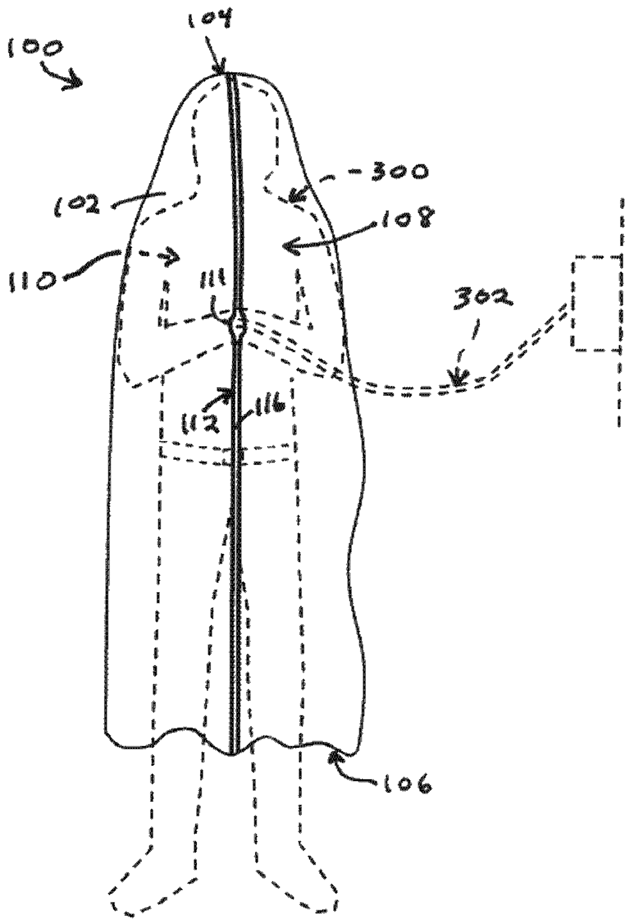
FIG. 1, in a perspective view, illustrates an embodiment of a smoke and fire protection device, according to the present application.

Disclosed herein is a sealed dome-like cover over the user such that, when the user has access to an external emergency source of oxygen, such as is generally available to workers in deep underground mines, the user can create a positive air pressure under the sealed dome-like cover in order to expel any smoke present there under.

In some embodiments, a plurality of sealed dome-like cover devices are joined to one another to cooperatively form an extended protection cover over a group of users in order to, for example, share a single emergency source of oxygen in a deep underground mine, as described above.

In some embodiments, the sealed cover device can be easily used by rescue personnel as a stretcher for carrying a disabled victim.

In some embodiments, the device comprises a cover made of a substantially flexible and fire resistant material. The cover is sized and shaped to overlay in a dome-like configuration a standing user from above the top of the head to at least slightly above the feet thereof, up to for example the waist.

In some embodiments, the cover includes a reclosable cover opening defined by a cut extending substantially rectilinearly through the cover material from the cover bottom edge to substantially adjacent the cover apex thereof, and along a substantially centered portion of the cover front portion extending therebetween.

In some embodiments, the device further includes a pair of complementary hook and loop (e.g. Velcro®) elements. Each one in the pair of complementary Velcro elements extends along external surface portions of the cover, and substantially longitudinally adjacently the whole length of a respective one in the pair of cover opening edges. Thus, a standing user may be protected from smoke and fire by covering himself or herself with the cover having its cover opening in a substantially sealably closed position by joining together the pair of complementary Velcro elements on each side thereof. Furthermore, a group of users may cooperatively protect themselves from smoke and fire wearing each the smoke and fire protection device by substantially sealably joining one in the pair of complementary Velcro elements of one device with one in the pair of complementary Velcro elements of an adjacent device. Hence is cooperatively formed an extended dome-like cover overlaying all the users for protection against smoke and fire. Advantageously, the group of protected user may thus share a single emergency source of oxygen tubing extending through a sufficiently sized opening configured manually between paired complementary Velcro elements. Such emergency oxygen source tubing is often provided for workers deep in underground mines.

In some embodiments, the device further comprises a portable bag for storing the cover. The bag may be typically configured for removably engaging the waist belt of the user.

In some embodiments, the cover may be provided with an air filter element, for allowing a user to breathe filtered air, and window sections made of flexible, transparent and fire resistant material located at eye level of the user.

In some embodiments, the device further comprises at least one strip of LED's powered by a power control device configured to turn automatically on the LED's when the cover is pulled out of the bag. More particularly, in some embodiments, the device comprises three strip's of LED's including a red and a green strip of LED's extending longitudinally parallelly on the right and left side respectively of the cover opening, and a white strip of LED's extending longitudinally centrally along the back of the cover, for allowing a distant observer having minimal knowledge of navigation color codes to relatively easily determine the orientation of a user wearing the device in a dark or smoke filled environment.

In some embodiments, the device further comprises a plurality of suitably located handle elements connected along inner side surfaces of the cover opening, joined with elongated reinforcement straps transversally extending along the cover inner surface and between the handle elements, for allowing rescue personnel to carry a disabled victim with the cover used as a stretcher in a cradle-like fashion.

In some embodiments, the device further comprises two adjacent handle elements along a cover opening edge, as described above, and a suitably configured pair of bag opening edges that engage through the adjacent handle apertures of the adjacent handle elements so as to allow the cover to be stored within the bag with the two adjacent handle elements protruding from the bag opening. Thus, the two adjacent handle elements may be used as convenient to use pull handles to pull out the cover from the bag.

In some embodiments the handle elements connected along the cover opening can serve four distinct purposes. First, they can be used by rescue personnel to transport a disabled victim, as described above. Second, two adjacent handle elements may be used as pull handle for quickly pulling out the cover from the bag in an emergency. Third, handle elements on each side of the cover opening may be used to at least minimally close the cover opening in an immediate emergency situation where no sufficient time is available to properly sealably close the cover opening with the pair of complementary Velcro elements along the cover opening. And fourth, a user protected by the cover having its cover opening properly sealably closed via the complementary Velcro elements, may use the handle elements to grab and firmly maintain in position the cover when having to cross a passage with high wind conditions or a dense bush-like forest.

Figure 4:
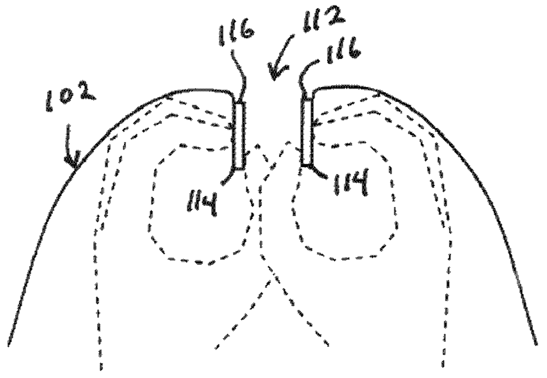
FIG. 4, in a cross-sectional top view, illustrates the manual joining of complementary Velcro elements along each cover opening edges of the cover.
Figure 6:
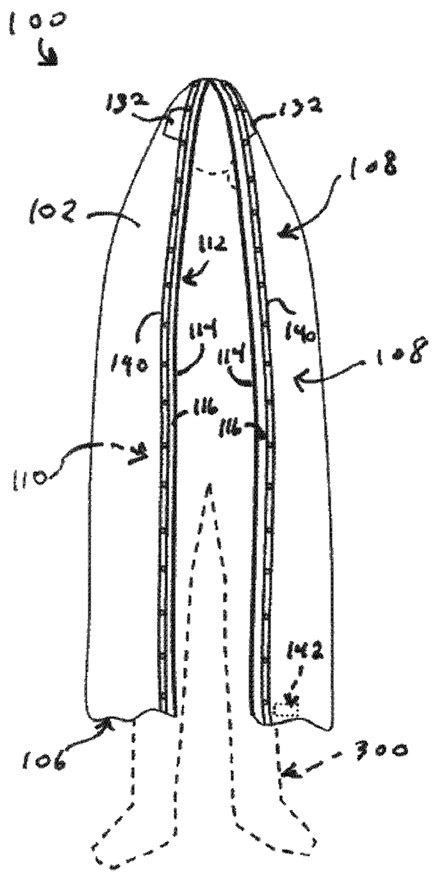
FIG. 6, in a front perspective view, illustrates the device in a semi-open position and worn by user.
Figure 7:
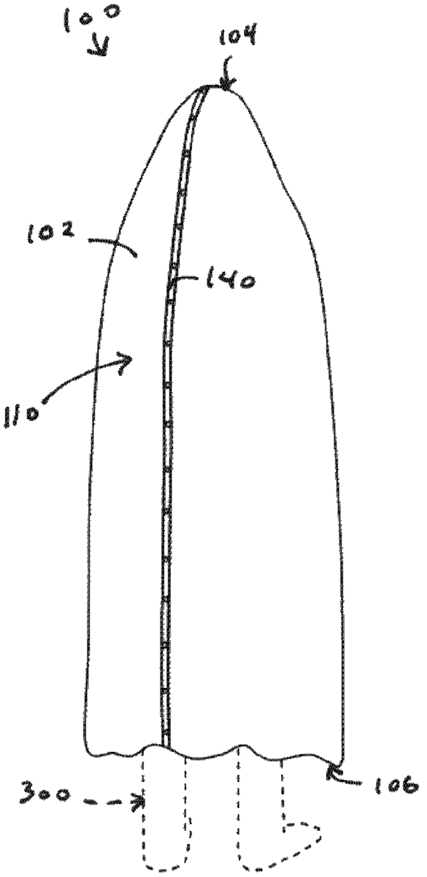
FIG. 7, in a rear perspective view, illustrates the device worn by user.

Referring to the drawings, FIG. 1, in a perspective view, illustrates an embodiment of a smoke and fire protection device, according to the present application, here shown covering a user and provided with a source of oxygen through an external tubing. FIG. 4, in a cross-sectional top view, illustrates the manual joining of complementary Velcro elements along each cover opening edges of the cover. FIG. 6, in a front perspective view, illustrates the device in a semi-open position and worn by user, the device being provided with an elongated strip of LED's extending parallelly longitudinally on each side of the cover opening. FIG. 7, in a rear perspective view, illustrates the device worn by user and is provided with a single elongated strip of LED's extending centrally along the rear of the cover.

FIG. 1 illustrates various aspects of an embodiment, according to the present application, of a smoke and fire protection device 100, hereinafter referenced more simply as the device 100. Referring to FIGS. 1, 4, 6 and 7, the portable smoke and fire protection device 100 comprises a cover 102 made of a substantially flexible and fire resistant material. Preferably, the cover 102 may have a bright coloured or light reflective exterior surface. The cover 102 is sized and shaped to overlay in a dome-like configuration a standing user 300 from above the top of the head to at least slightly above the feet thereof. Thus, when worn by the user 300, the cover 102 defines a cover apex 104 above the head of the user 300, a cover bottom edge 106 distally oppositely thereof, a cover front portion 108, and a cover rear portion 110.

The cover 102 includes a reclosable cover opening 112 defined by a cut extending substantially rectilinearly through the cover material (as best illustrated in FIGS. 1 and 6), from the cover bottom edge 106 to substantially adjacent the cover apex 104, and along a substantially centred portion of the cover front portion 108 extending therebetween. Thus the cover opening 112 defines a pair of cover opening edges 114.

The device 100 further comprises a pair of complementary Velcro elements 116. Each one in the pair of complementary Velcro elements 116 extends along external surface portions of the cover 102, and substantially longitudinally adjacently the whole length of a respective one in the pair of cover opening edges 114.

Thus, with reference to FIGS. 1 and 4, the standing user 300 may be protected from smoke and fire by covering himself or herself with the cover having its cover opening 112 in a substantially sealably closed position by joining together the pair of complementary Velcro elements 116 on each side thereof.

The user 300 may further be provided with fresh oxygen by extending an emergency source of oxygen tubing 302 through a sufficiently sized opening 111 configured manually between the pair of complementary Velcro elements 116 of the cover opening 112, thus forcing any smoke present under the cover 102 to be expelled by positive air pressure through the space below the cover bottom edge 106.

Figure 5:
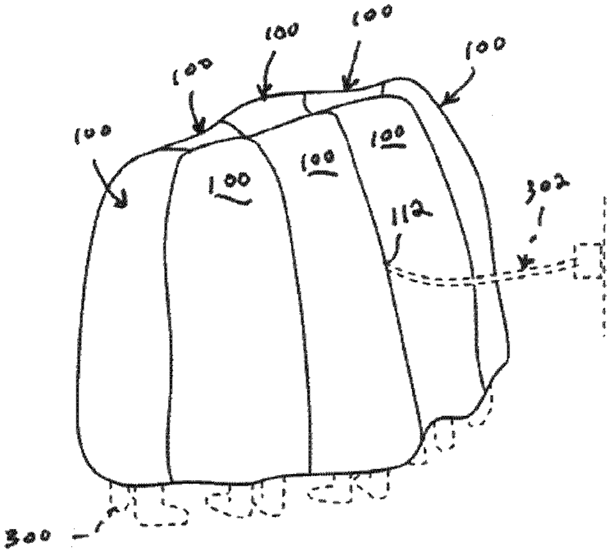
FIG. 5, in a perspective view, illustrates a plurality of users cooperatively protected by a plurality of devices.

FIG. 5, in a perspective view, illustrates a plurality of users cooperatively protected by a plurality of devices of the present application having each their cover opening edges joined to one another so as to form an extended dome-like cover, and further provided with a source of oxygen through an external tubing. Furthermore, referring to FIG. 5, a group of users 300 may cooperatively protect themselves from smoke and fire wearing each the smoke and fire protection device 100 by substantially sealably joining one in the pair of complementary Velcro elements 116 of one device 100 with one in the pair of complementary Velcro elements 116 of an adjacent device 100.

Hence is cooperatively formed an extended dome-like cover overlaying all the users 300. Advantageously, the group of users 300 may further be provided with fresh oxygen by sharing a same emergency source of oxygen tubing 302 extending through a sufficiently sized opening 111 configured manually between paired complementary Velcro elements 116 of two adjacent devices 100. Thus forcing any smoke present under the extended dome-like cover to be forcibly expelled by positive air pressure through the space below the latter.

Figure 2:
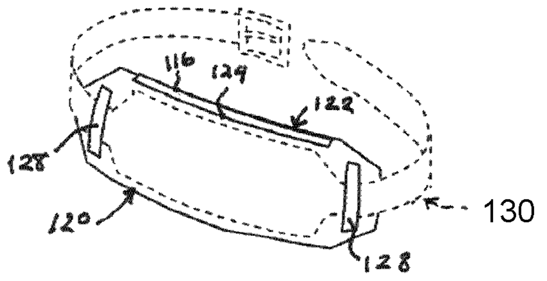
FIG. 2, in a perspective view, illustrates an embodiment of bag for storing a cover of the device.
Figure 3:
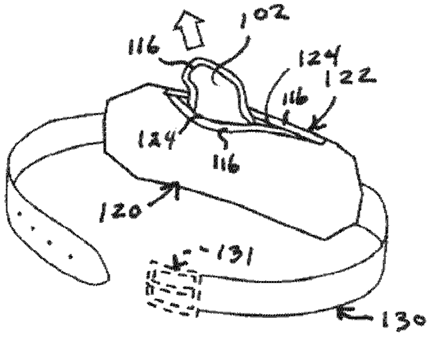
FIG. 3, in a perspective view, illustrates another embodiment of bag for storing a cover of the device.

FIG. 2, in a perspective view, illustrates an embodiment of bag for storing a cover of the device, here shown in a closed position and removably engaged to the waist belt element of a user. FIG. 3, in a perspective view, illustrates another embodiment of bag for storing a cover of the device, here shown in an open position and provided with an integral waist belt element. Referring to FIGS. 2 and 3, in some embodiments, the device 100 further comprises a portable bag 120 for storing the cover 102. The bag 120 includes a re-closable bag opening structure 122. Furthermore, the bag opening structure 122 includes suitably configured complementary Velcro elements 116 extending along oppositely facing bag opening edges 124 thereof that are configured to overlap one another.

The bag 120 is sufficiently sized and shaped for storing therein the cover 102 folded in a substantially compact state.

Figure 12:
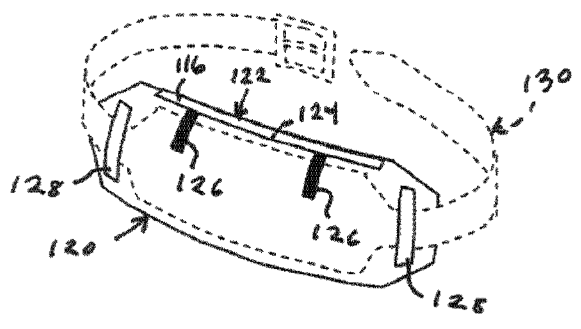
FIG. 12, in perspective view, illustrates another embodiment of a bag for storing a cover of the device.
Figure 13:
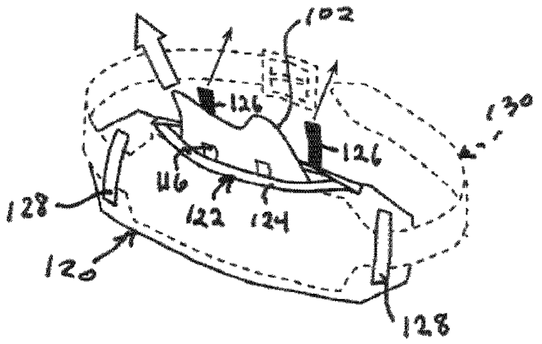
FIG. 13, in perspective view, illustrates the embodiment of the bag in FIG. 12.

FIG. 12, in perspective view, illustrates another embodiment of a bag for storing a cover of the device, here shown in a closed position and with pull string elements provided along the opening of the bag. FIG. 13, in perspective view, illustrates the embodiment of the bag in FIG. 12, here shown in an open position resulting from pulling on one of the pull strings. Referring to FIGS. 12 and 13, in some embodiments, the bag opening structure 122 further includes at least one string element 126. Each of the at least one pull string element 126 has one end connected in a space apart relationship along a portion of a same edge portion of the bag opening structure 122. The at least one pull string element 126 is configured and sized for facilitating the opening of the bag 120 by pulling on the pull string element 126. Preferably, the bag opening structure 122 includes two pull string elements 126. Further preferably, each pull string element 126 having a length, diameter, surface texture and color that are suitably selected to facilitate locating each pull string element 126 by sight or touch, grabbing and pulling on the latter's while the user 300 is in darkness and/or smoke filled conditions, so as to forcibly open the bag 120 and, thus, relatively quickly and easily gaining access to the cover 102 independently of the surrounding conditions. Other known configurations for the pull string element 126 are also possible for facilitating the opening of the bag 120.

Referring to FIG. 2, in some embodiments of the device 100, the bag 120 further includes at least one belt loop structure 128 connected to, or otherwise through, a surface portion of the bag 120 and is configured for removably engaging therethrough a portion of the user's 300 own belt element 130.

As exemplified in the figure, there is shown the device 100 engaged through its belt loop structures 128 along a miner's belt 130 having sometimes a widened portion covering the back of the user 300. Conveniently, the bag 120 storing the cover 102 may extend along a rear inner surface portion of the belt 130 for an enhanced comfort.

A typical procedure to retrieve the cover 102 from the bag 120 thus engaged on a belt element 130 of the user 300 may consist in, first, slightly loosening the belt 130 along the waist, rotate the bag 130 to the front and open the bag opening structure 122 to retrieve the cover 102 there from.

In some other embodiments of the device 100, the bag 120 further includes a waist belt 130 stitched, attached or otherwise integrated along a surface portion of the bag 120. The waist belt 130 may have any suitable type of buckle element 131 and is configured for allowing the user 300 to conveniently wear the device 100, for example, around the waist. Other types of belt 130 and buckle element 131 combinations are also possible. Thus, the device 100, generally including the cover 102, the bag 120 and the belt element 130, may be commercialised as a single product.

Figure 19:
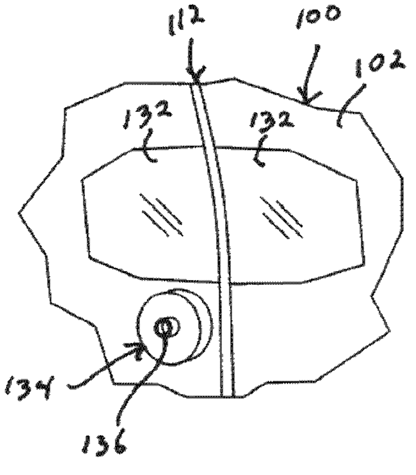
FIG. 19, in partial perspective view, illustrates an inner surface portion of the cover.

FIG. 19, in partial perspective view, illustrates an inner surface portion of the cover, here showing a pair of transparent window sections on each side of the cover opening (in a closed position), and an air filter connected to the cover. Referring to FIGS. 6 and 19, in some embodiments of the device 100, the cover 102 further includes at least one portion thereof in the form of a window section 132 made of a substantially flexible, fire resistant and transparent material located substantially in register with the eyes of the user 300 wearing the device 100.

Preferably, the cover 102 includes two window sections 132 that are each located respectively proximally on each side of the cover opening 112, and substantially in register with the eye region of the user 300.

Other configurations and locations for the window sections 132 are also possible.

Still referring to FIG. 19, in some embodiments, the device 100 further comprises an air filter element 134. The air filter element 134 is secured to a portion of the cover 102 and is configured for allowing the user 300 wearing the device 100 to breathe filtered air.

Preferably, as illustrated in FIG. 19, the air filter element air filter element 134 is a relatively small air filter unit secured to a portion of the cover 102 that is substantially adjacent on one side of the bag opening structure 122 and substantially vertically in register with the mouth of the user 300 wearing the device 100.

Preferably, the air filter element 134 typically includes an air input and an exhaust air output (not shown in the figures) extending through the cover 102 so that they are both in fluid communication with the outside air of the cover 102, and a mouthpiece air intake 136 on the inside of the cover 102, thus, allowing a user 300 to breath in filtered air and expel air outside the cover 102. Other configurations and types of air filter element are also possible.

Figure 10:
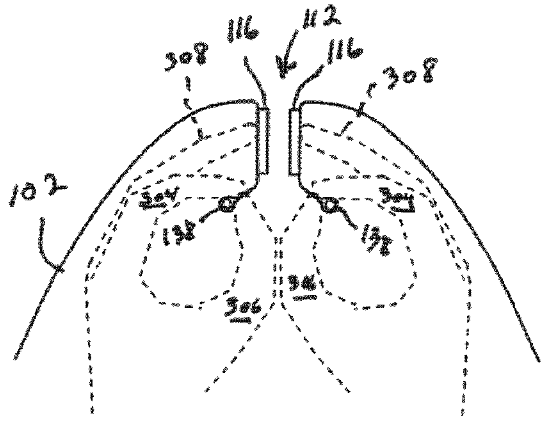
FIG. 10, in a cross-sectional top view, illustrates the manual joining of complementary Velcro elements of the cover opening.

FIG. 10, in a cross-sectional top view, illustrates the manual joining of complementary Velcro elements of the cover opening through the use of bulge configurations extending longitudinally along each cover opening edge. Referring to FIG. 10, in some embodiments of the device 100, the cover opening edges 114 each define at least a small bulge 138 in cross-section to facilitate joining and sealably securing together the pair of complementary Velcro elements 116 on each side of the cover opening 112.

Thus, the user 300 may securely pinch each opposing edge portions of the cover opening 112 between the index 304 and the thumb 306 of each hand respectively then, with the middle finger 308 of each hand, push on the back of a respective one in the pair of complementary Velcro elements 116 towards the other one so as to close the cover opening 112.

Figure 11:
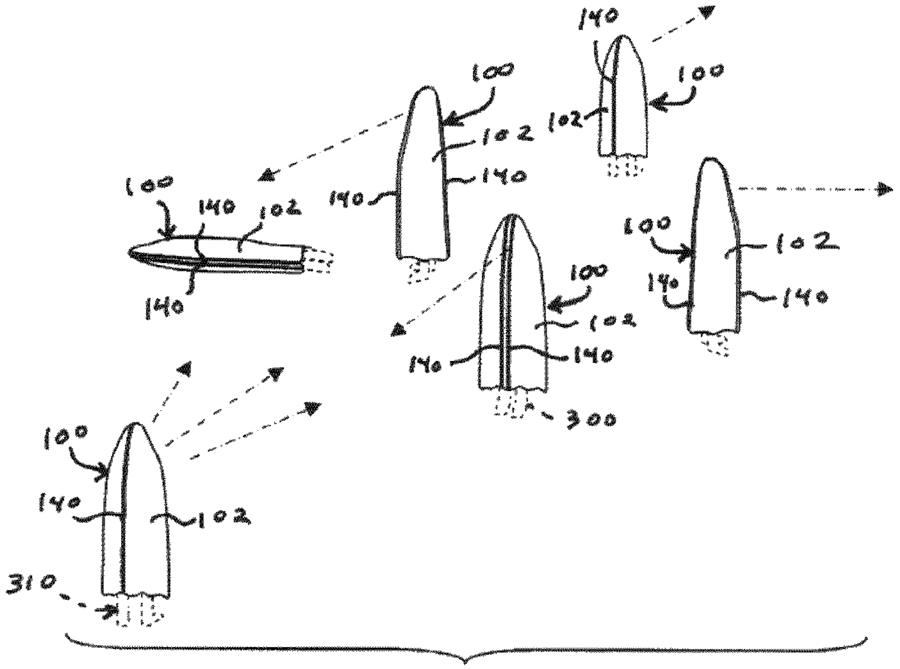
FIG. 11, in a perspective view, illustrates scattered users each wearing the device.

FIG. 11, in a perspective view, illustrates scattered users each wearing the device and wherein one of them can determine the individual orientation of each one among the group of users through the color code differentiating each strip of LED's their respective device. Referring to FIGS. 6 to 9, and 11, in some embodiments, the device 100 further comprises at least one strip of LED's 140.

The at least one strip of LED's 140 extending along at least one outer surface portion of the cover 102 so as to facilitate locating at a distance one or more users 300 wearing the device 100 in darkness and/or smoke filled conditions.

Figure 8:
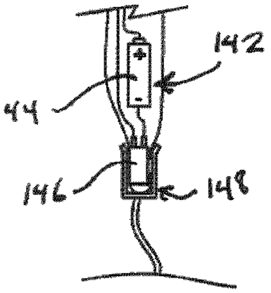
FIG. 8, in partial cross-sectional view, illustrates a power control circuit.
Figure 9:
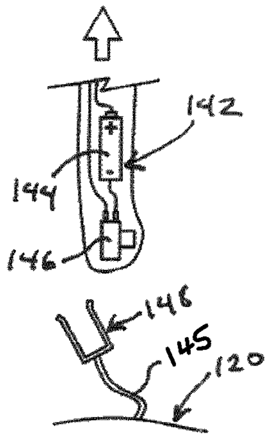
FIG. 9, in partial cross-sectional view, illustrates the power control circuit in FIG. 8.

FIG. 8, in partial cross-sectional view, illustrates a power control circuit for the strips of LED's, here shown engaged in a releasable clamp element attached to an inner surface of the bag. FIG. 9, in partial cross-sectional view, illustrates the power control circuit in FIG. 8, here shown released from the releasable clamp element. Referring to FIGS. 6, 8, 9. The at least one strip of LED's 140 is electrically connected to a battery powered control circuit 142 secured to a suitable location along the cover 102 such as, for example, along the cover lower edge 106.

The power control circuit 142 preferably includes at least one battery 144 and a control switch 146 configured to automatically turn on the at least one strip of LED's 140 when the cover 102 is pulled out of the bag 120.

Preferably, the control switch 146 is a normally closed switch releasably kept in an activated state by a suitably sized and configured clamp element 148

As exemplified in FIGS. 8 and 9, the clamp element 148 may be represented by a substantially U-shaped member having one portion thereof releasably engaged on the normally closed control switch 146, and another portion thereof attached to an inner wall surface portion of the bag 120, for example, via a string 126.

In some embodiments of the device, the power control circuit 142 further includes a LED flashing control element (not shown in the figures) for clearly identifying a group leader among users 300 each wearing a device 100 having non flashing strips of LED's 140.

As exemplified in the figures, in some embodiments, the device 100 includes three strips of LED's 140. One strip of LED's extends parallel adjacently a respective one in the pair of complementary Velcro elements 116 and opposite the cover opening 112, and one strip of LED's 140 extending substantially rectilinearly along a centered position of the cover rear portion 110, between the cover bottom edge 106 and the cover apex 104.

Furthermore, each strip of LED's 140 has a differently colored set of LED's relative to the two others, for allowing a distant observer to determine the orientation of a user 300 wearing the device 100 through darkness and/or a smoke filled environment.

Thus, as illustrated in FIG. 11, by examining the position of the three colors, a distant observer 310 may determine through darkness and/or a smoke filled environment that a user 300 wearing the device 100 is facing towards self, sideways left or right, away from the observer, is sitting on an object, or is lying Preferably, the color of each one of the three strips of LED's 140 is, respectively from the point of view of an observer, red and green for the strips of LED's 140 extending along the right and left side respectively, of the cover opening 112, and white for the strip of LED's 140 extending centrally along the cover rear portion 110.

Thus, an observer having minimal navigation knowledge may relatively easily determine the orientation of a user 300 wearing the device 100 since the color disposition correspond to the international navigation color code for signaling lights and beacons on ships and airplanes. Other color codes are also possible to differentiate each of the strips of LED's 140 on the device 100.

As would be obvious to someone familiar with emergency equipment and clothing's, additional strips of LED's 140, and/or individual LED's, may be provided along outer surface portions of the cover 102 to enhance its visibility in darkness and/or smoked filled conditions. For example (not shown in the figures), an additional strip of LED's may extend transversally across the shoulder level of the user 300 wearing the device 100, as well as all along the cover bottom edge 106.

Figure 16:
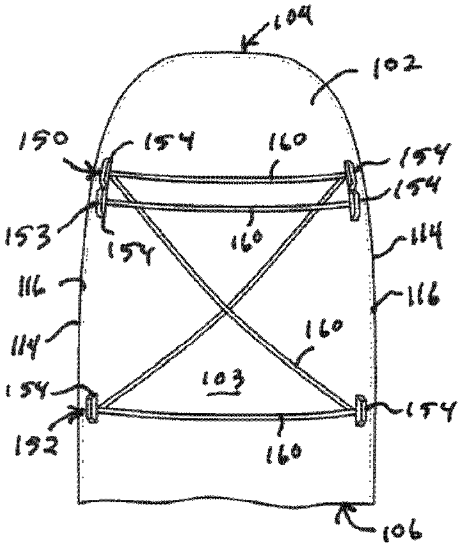
FIG. 16, in plan view, illustrate the inner surface of the cover.
Figure 17:
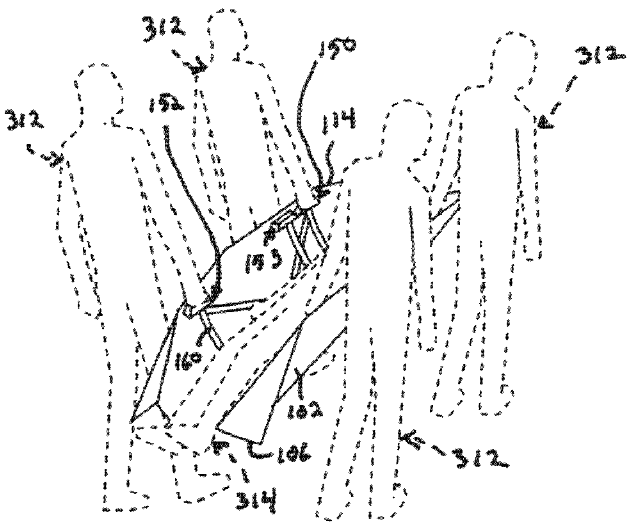
FIG. 17, in perspective view, illustrates the cover in FIG. 16, here shown used as a stretcher.

FIG. 16, in plan view, illustrate the inner surface of the cover, here shown provided with pairs of handle elements linked through a plurality of reinforcement straps, all stitched, attached or otherwise connected along inner surface portions of the cover. FIG. 17, in perspective view, illustrates the cover in FIG. 16, here shown used as a stretcher by rescue personnel for transporting a disabled victim in a cradle-like fashion therewith. Referring to FIGS. 16 and 17, in some embodiments, the device 100 further comprises at least a first and a second pair of handle elements 150 and 152.

Each handle element 154 in the first and second pair of handle elements 150 and 152 is connected to the cover 102 and defining a handle aperture 156 for allowing the user 300 to grab the handle element 154 with at least one hand.

Each handle element 154 in the first pair of handle elements 150 is located substantially adjacent a respective edge in the pair of cover opening edges 114 and substantially in register with an upper chest portion of the user 300 wearing the cover 102.

Furthermore each handle element 154 in the second pair of handle elements 152 is located substantially adjacently a respective edge in the pair of cover opening edges 114, and at least slightly closer to the cover lower edge 106 relative to the first pair of handle elements 150.

Thus, four rescue personnel 312 can each grip one handle element 154 to carry a disabled victim 314 in a cradle-like fashion within the cover 102.

In some embodiments, the device 100 further comprises a plurality of reinforcement straps 160. Each one in the plurality of reinforcement straps 160 extends along, and is connected to, a surface portion of the cover 102.

Furthermore, at least one in the plurality of reinforcement straps 160 extends transversally between, as well as being connected to, each handle element 154 in each one of the first and second pair of handle elements 150 and 152 respectively. Furthermore, at least one in the plurality of reinforcement straps 160 extends transversally diagonally between handle elements 154 of the first and second pair of handle elements 150 and 152 along opposed cover opening edges 114.

Preferably, the first and second pair of handle elements 150 and 152, and the plurality of reinforcement straps 160 are located along inner surface portions 103 of the cover 102, as exemplified in the figures.

Figure 14:
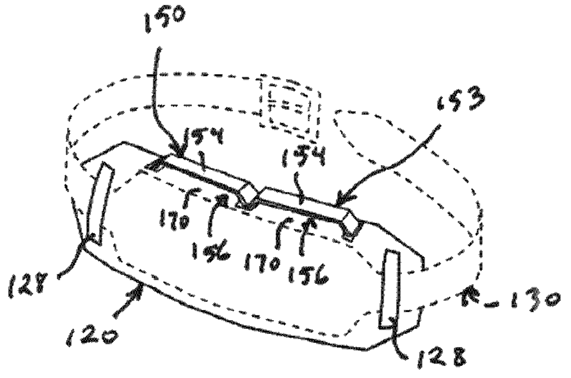
FIG. 14, in perspective view, illustrates another embodiment of a bag for storing a cover of the device.
Figure 15:
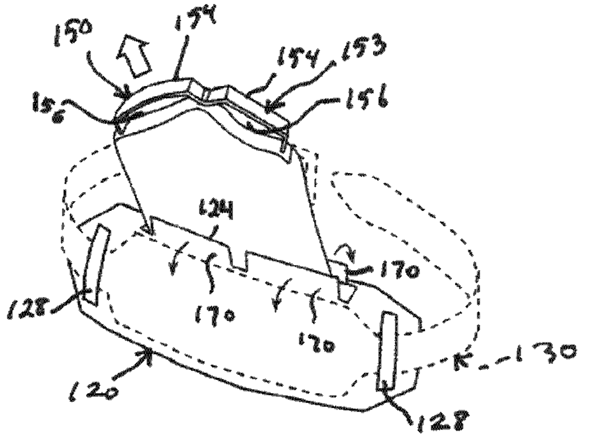
FIG. 15, in perspective view, illustrates the embodiment of the bag in FIG. 14.

FIG. 14, in perspective view, illustrates another embodiment of a bag for storing a cover of the device, here shown in a closed position and having portions of its bag opening edges removably engaged by Velcro elements through respective openings in a pair of adjacent handle elements connected to the cover. FIG. 15, in perspective view, illustrates the embodiment of the bag in FIG. 14, here shown in an open position resulting from pulling on one of the two handle elements connected to the cover. Referring to FIGS. 14 and 15, in some embodiments, the device 100 further comprises a third pair of handle elements 153. Each handle element 154 in the third pair of handle elements 153 is located substantially adjacently a respective edge in the pair of cover opening edges 114 and in proximity to a respective handle element 154 in the first pair of handle elements 150.

Furthermore, the oppositely facing bag opening edges 124 defines therealong two pairs of oppositely facing, complementary tabs 170 configured and sized to be joined and removably secured to one another in an overlapping fashion through a respective handle aperture 156 of one of the two adjacent handle elements 154 of the first and third pair of handle elements 150 and 153 located along a same cover opening edge 114, with the rest of the cover stored within the bag 120.

Thus, adjacent handle elements 154 of the first and third pair of handle elements 150 and 153 may be used as pull handles to quickly pull out the cover 102 from the bag 120, as illustrated in FIG. 15.

The third pair of handle elements 153, in combination with the first pair of handle elements 150, may advantageously serve four different purposes as described hereinafter.

Firstly, a user 300 wearing the bag 120 storing the cover 102 along a rear portion of a waist belt may extend one of the left or right hand along the back and substantially easily locate by touch, then grab and pull on the handle element 154 located closest to the hand, in order to promptly extract all the cover from the bag 120 in one move of the hand (as best illustrated in FIG. 15).

Figure 18:
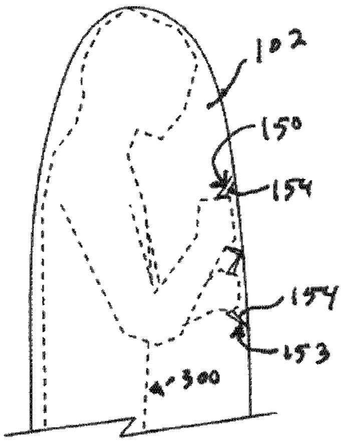
FIG. 18, in partial cross-sectional view, illustrates a user covered with the device.

FIG. 18, in partial cross-sectional view, illustrates a user covered with the device and grabbing a pair of handle elements provided on each side of the cover opening. Furthermore, as illustrated in FIG. 18, a user 300, in a surprise emergency situation requiring immediate protection of a cover due to the sudden proximity of fire flames, and where insufficient time is available to properly sealably close the cover opening with the Velcro elements 116, the user may quickly pull the cover 102 out of the bag 120 and overlay himself or herself therewith, followed with at least minimally closing the cover opening 112 along two positions thereof by simply grabbing and maintaining together the paired handle elements 154 on each side of the cover opening 114, and run for more shelter.

Furthermore, a user 300 overlaid with the cover 102 in a closed position and having to cross a distance through high winds or a dense forest, may further securely hold and maintain the cover 102 in position over his or her body by firmly grabbing and holding with each hand a respective pair of corresponding handle elements 154 of the adjacent first and third pairs of handle elements 150 and 153, as illustrated here again in FIG. 18.

Advantageously, rescue personnel may use the two adjacent handle elements 154 of the first and third pair of handle elements 150 and 153 on a respective side of the cover 102, when used as a stretcher, to efficiently lift a relatively heavy victim with each hands grabbing a respective handle element 154.

Figure 20:
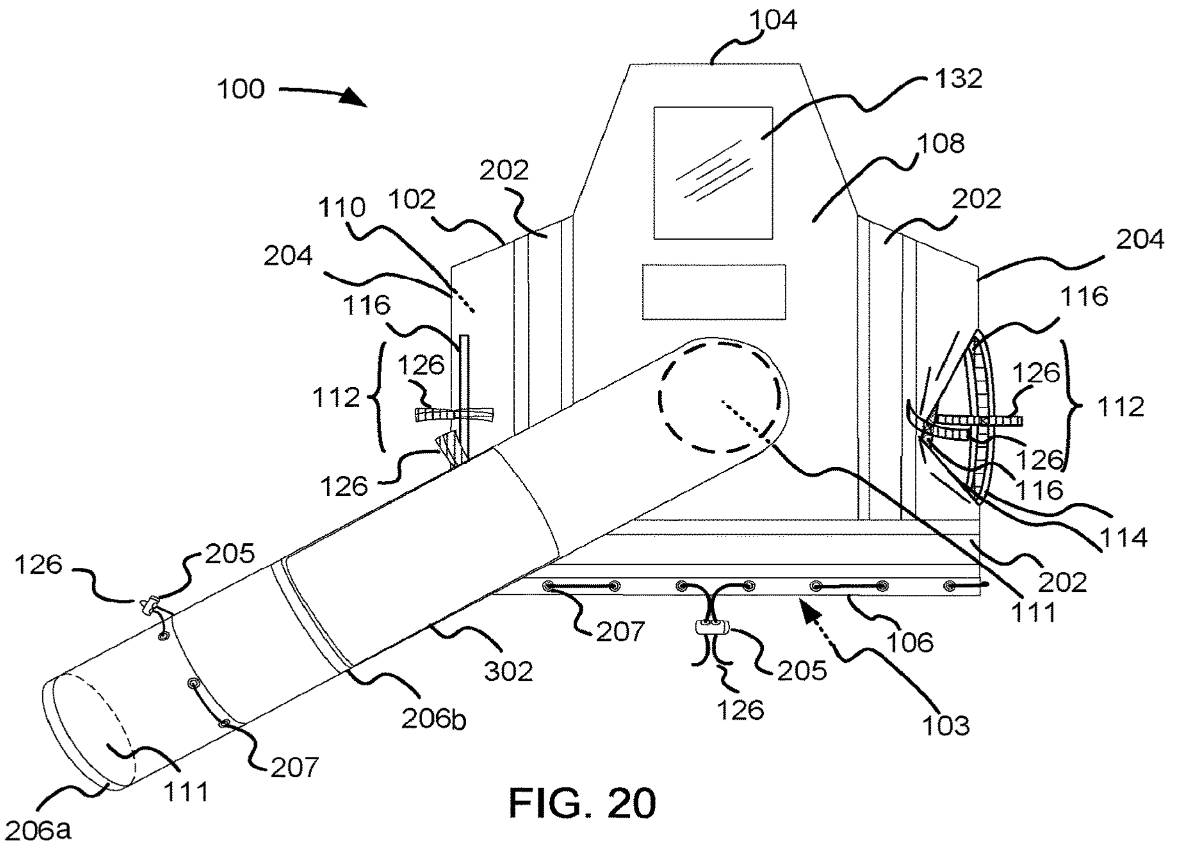
FIG. 20, in a front plan view, illustrates an embodiment of a smoke and fire protection device, according to the present application.
Figure 21:
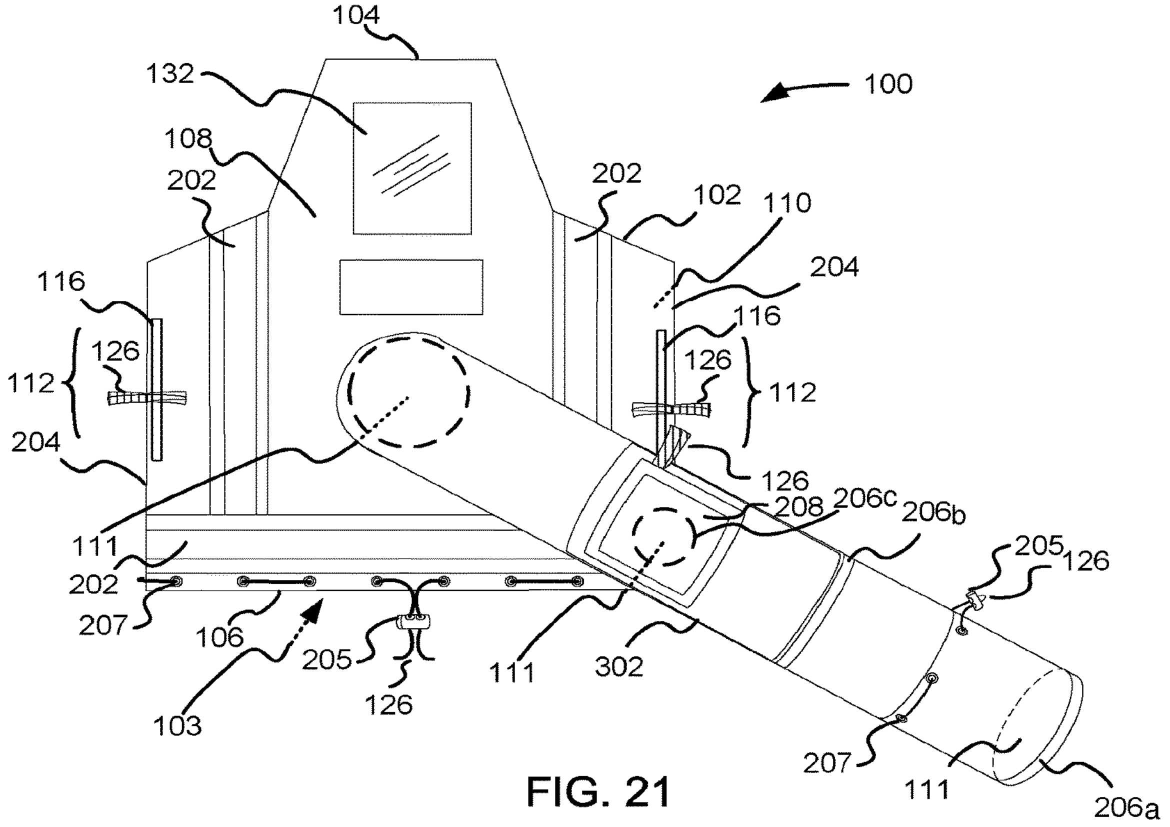
FIG. 21, in a front plan view, illustrates further details of the device of FIG. 20.
Figure 22:
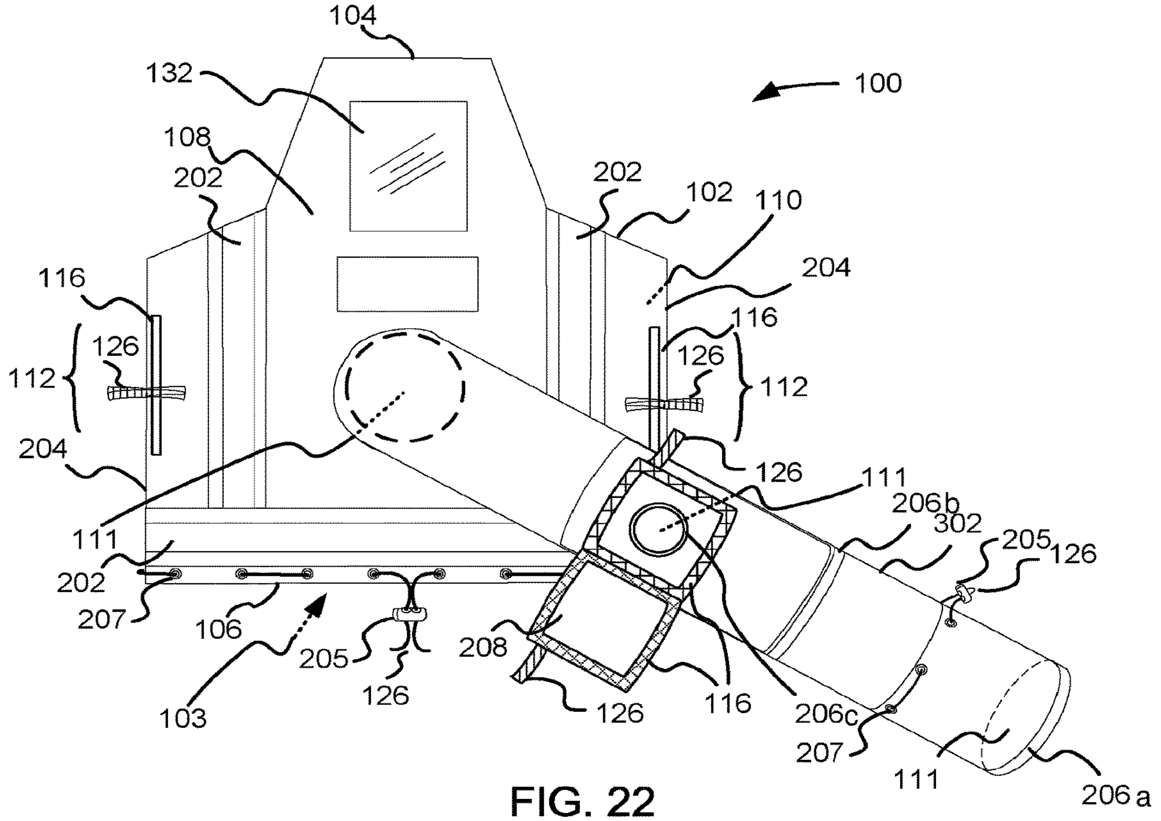
FIG. 22, in a front plan view, illustrates further details of the device of FIG. 20.
Figure 23:
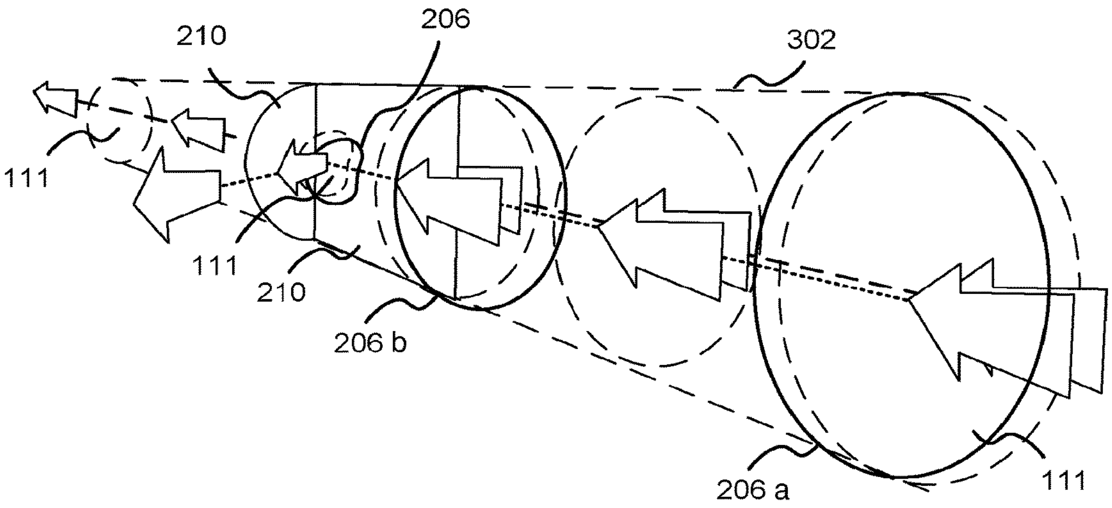
FIG. 23, in a front perspective view, illustrates further details of the device of FIG. 20.
Figure 24:
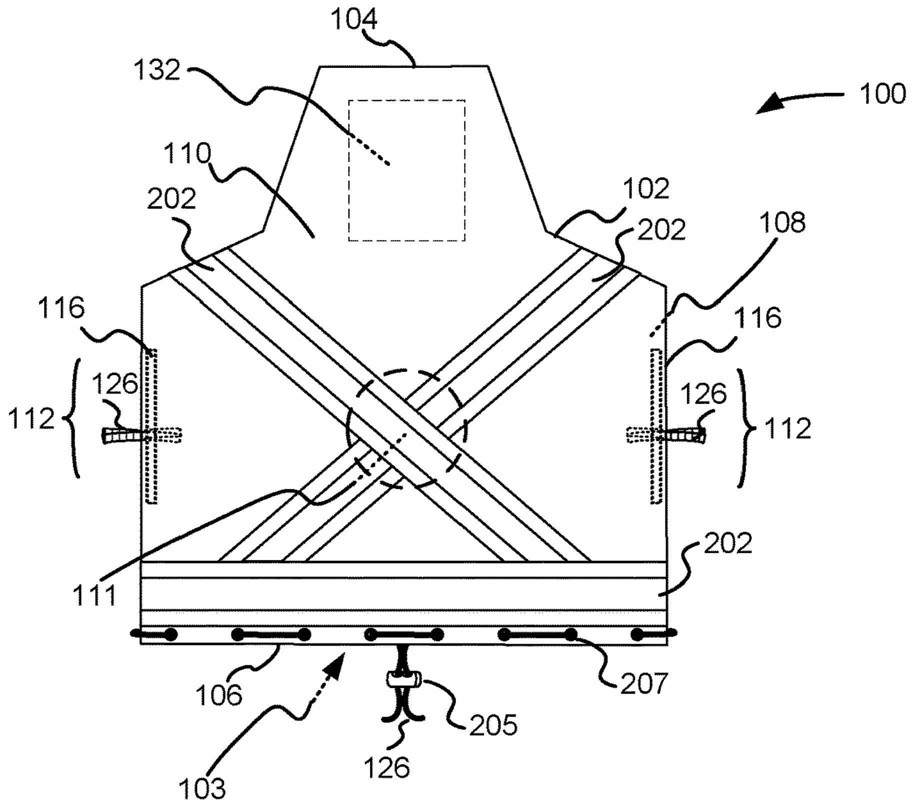
FIG. 24, in a rear plan view, illustrates further details of the device of FIG. 20.

FIG. 20, in a front plan view, illustrates an embodiment of a smoke and fire protection device, according to the present application. FIG. 21, in a front plan view, illustrates further details of the device of FIG. 20. FIG. 22, in a front plan view, illustrates further details of the device of FIG. 20. FIG. 23, in a front perspective view, illustrates further details of the device of FIG. 20. FIG. 24, in a rear plan view, illustrates further details of the device of FIG. 20. Referring to FIG. 20-24, the portable smoke and fire protection device 100 comprises a cover 102 made of a substantially flexible and fire resistant material. Preferably, the cover 102 may have several high visibility strips 202 having a bright coloured or light reflective exterior surface. The cover 102 is sized and shaped to overlay in a dome-like configuration a standing user 300 from above the top of the head to at least slightly above the feet thereof, up to around the wais of the user. Thus, when worn by the user 300, the cover 102 defines a cover apex 104 above the head of the user 300, a cover bottom edge 106 distally oppositely thereof, a cover front portion 108, a cover rear portion 110, and two side edges 204 to the left and right of the user, and an inner portion 103. The cover front portion 108 and cover rear portion 110 are joined together at the apex 104 and the side edges 204, with the bottom edge 106 remaining open. A draw string 126, cord lock 205, and eyelets 207 are provided on the bottom edge 106 in order to enable the user to achieve a snug fit to adjust air pressure while ensuring smoke can still be expelled.

The cover 102 includes a pair of reclosable cover openings 112 defined by cuts extending substantially rectilinearly through a portion of the side edges 204 of the cover material 102 (as best illustrated in FIG. 20—cover opening 112 on left side edge 204 is closed, cover opening 112 on right side edge 204 is open), from a predetermined distance from the cover bottom edge 106 to a predetermined distance from the cover apex 104, and along a substantially side of the cover front portion 108 extending therebetween coinciding with the position of the left and right arms of the user 300. Thus the cover opening 112 defines a pair of cover opening edges 114. Pairs of strips or pull cords 126 are provided centrally to each cover opening in order to facilitate opening and closing thereof by the user, to for example, pass one or both arms through the respective cover opening 112.

The user 300 may further be provided with fresh oxygen by extending an integrated oxygen tubing 302, defining a sufficiently sized opening 111 provided on the front cover portion 110, thus forcing any smoke present under the cover 102 to be expelled by positive air pressure through the space below the cover bottom edge 106. The tubing 302 is connected to the cover 102 at its proximal end, and has another sufficiently sized opening 111 provided on the distal end thereof. A first ring 206*a* is provided at the distal end to ensure that the distal opening 111 provided at the distal end of the tubing 302 remains biased in an open position. The ring 206*a* is sturdy enough to bias the tubing 302 open, but flexible enough that it can be compressed while in storage or to pass through an opening. A second or middle ring 206*b* is provided around a third of the way from the distal end of the tubing 302, and a pull string 126 is provided with eyelets 207 and cord lock 205 substantially at a mid point between the first and second rings 206*a* and 206*b* so that the tubing 302 can be tightened around an oxygen source. Advantageously, when the pull string 126 is tight around an oxygen source, the first or distal ring is biased towards the oxygen source thereby improving the seal, for example by abutting against the wall of the mine where the oxygen source is provided. A third or lateral ring 206*c* is provided between the second ring 206*b* and the proximal end of the tubing 302, at an angle which is substantially perpendicular to the first two rings. This third or lateral ring 206*c* is of a smaller diameter, for example half, of the first and second ring 206*a* and 206*b*. The third or lateral ring 206*c* is provided coincidental with a third or lateral opening 111 of similar size to the third or lateral ring provided on the side of tubing 302 (as best illustrated in FIGS. 21 and 23). A flap 208 having pull strings or strap 126 is provided on the side of the tubing to cover the third or lateral opening 111 and can be opened or closed to gain access to or prevent access to the third or lateral opening 111. As best illustrated in FIG. 23, air flows generally from the distal end of tubing 302 through distal opening 111 towards the proximal end of tubing 302 through proximal opening 111. A chamber 210 is provided after the second ring 206*b* having a section that corresponds to a portion, such as one half, of the section of the tubing 302, such that, if the flap 208 is open, air is split at the chamber and the corresponding portion of the air is forced to go through the third opening 111 by the chamber 210. Thus, advantageously, a second user can pass the distal ring of their device through the third opening of the device of a first user, thereby enabling the second user to share the oxygen source of the first user. Given that the diameter of the lateral ring is smaller than the diameter of the distal ring, once the distal ring is through the lateral opening, it tends to stay connected, any jerking or pulling being frustrated by the difference in diameters of the rings, which also helps create a tight seal between the respective tubing of each user. To connect or disconnect, the second user squeezes their distal ring to render the profile oval having a dimension smaller than the lateral opening of the first user, and thus the distal ring of the second can pass through the lateral opening of the first user's tubing. The result is a releasable and re-sealable connection for passing oxygen between user devices.

Figure 25:
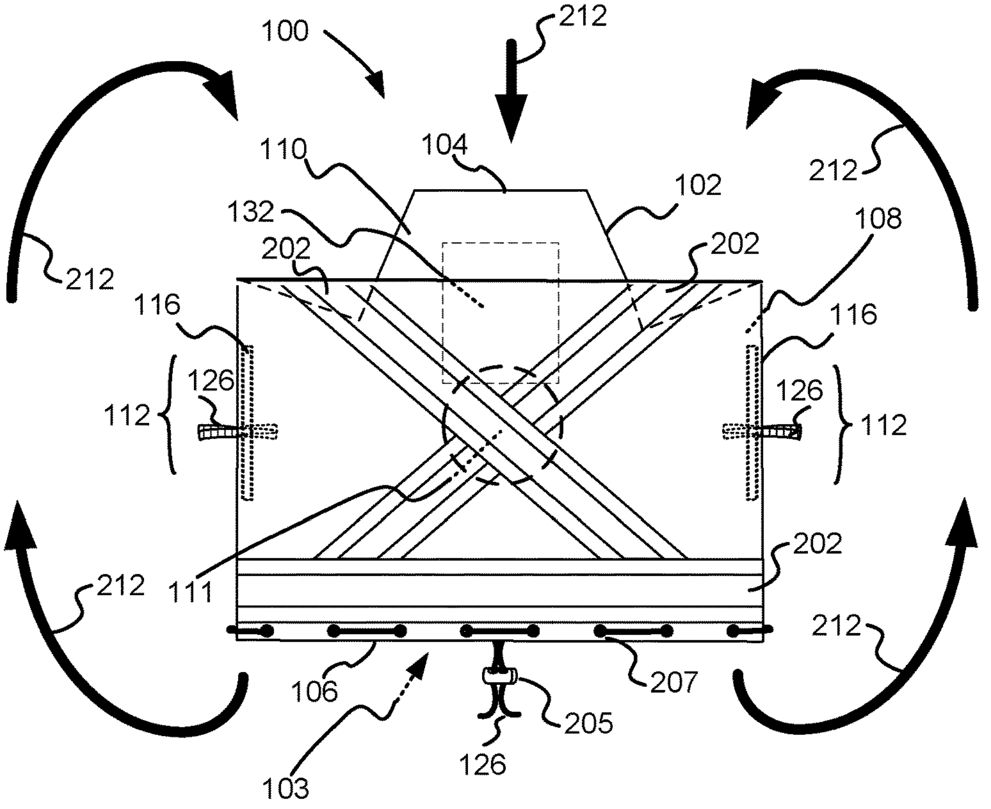
FIG. 25, in a rear plan view, illustrates the reversible nature of the device of FIG. 20.
Figure 26:
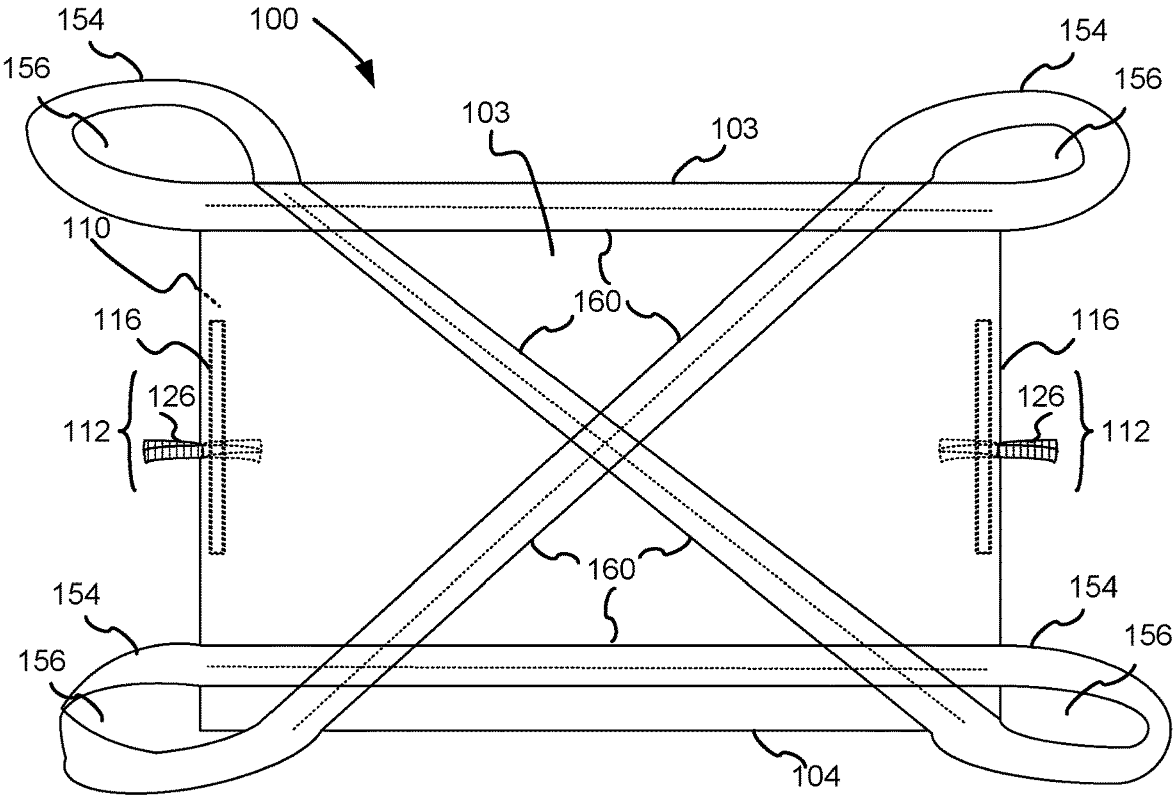
FIG. 26, in a front plan view, illustrates a reversed configuration of the device of FIG. 20.
Figure 27:
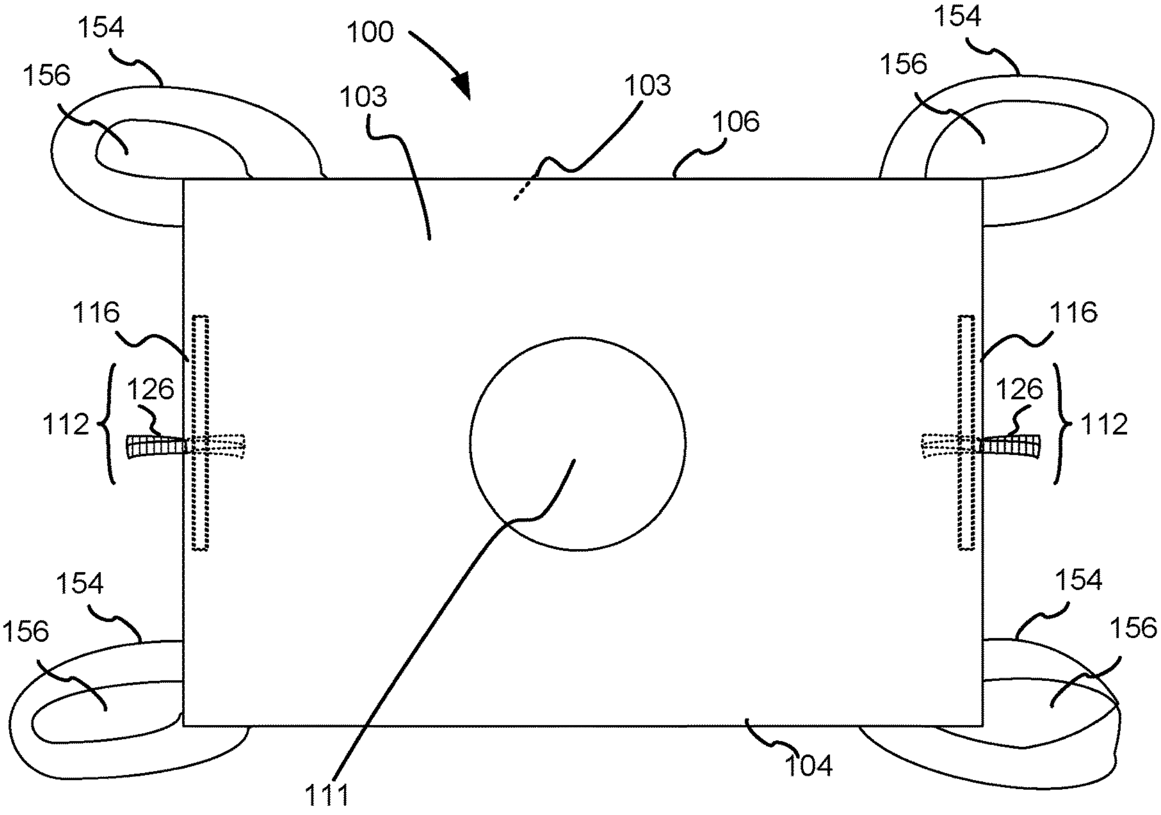
FIG. 27, in a front plan view, illustrates a reversed configuration of the device of the device of FIG. 20.
Figure 28:
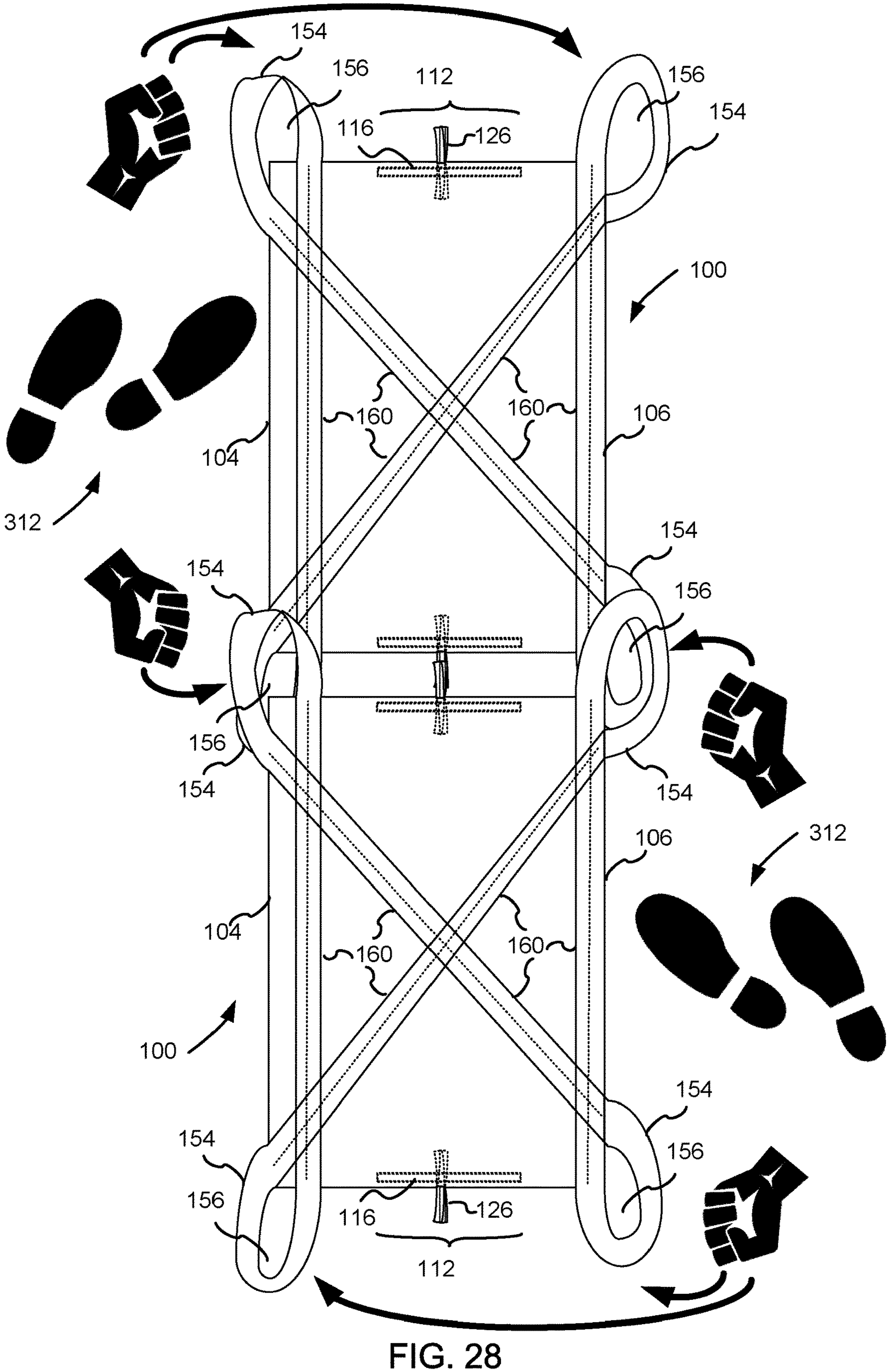
FIG. 28, in a front plan view, illustrates two devices of FIG. 26, here shown used as a stretcher.

FIG. 25, in a rear plan view, illustrates the reversible nature of the device of FIG. 20. FIG. 26, in a front plan view, illustrates a reversed configuration of the device of FIG. 20. FIG. 27, in a front plan view, illustrates a reversed configuration of the device of the device of FIG. 20. FIG. 28, in a front plan view, illustrates two devices of FIG. 26, here shown used as a stretcher. Referring to FIG. 25, the device 100 can be reversed 212 by pushing the apex 104 in between the front portion 108 and rear portion 110 of the cover 102, while rolling the bottom edge 106 towards the apex 104, to reveal the inner portion 103 of cover 102. The resulting reversed configuration is illustrated in FIGS. 26-27. In some embodiments, the device 100 further comprises a plurality of reinforcement straps 160. Each one in the plurality of reinforcement straps 160 extends along, and is connected to, a surface portion of the cover 102, and as illustrated in FIG. 26, are provided on the reversed front portion 108 of the cover 102. Advantageously, the reinforcement straps 160 form four handles 154 with corresponding apertures 156 at each corner. Furthermore, at least one in the plurality of reinforcement straps 160 extends transversally between handle elements 154. Furthermore, at least one in the plurality of reinforcement straps 160 extends diagonally between, handle elements 154.

Referring to FIG. 28, advantageously, rescue personnel may use two adjacent devices 100 in a reversed configuration by aligning two handle elements 154 of the first device with two handle elements 154 of the second device such that their respective apertures 156 overlap, such that when used as a stretcher, two people can efficiently lift a relatively heavy victim with each hand grabbing two respective handle elements 154 at a time. In the case of the first rescue personnel 312, if the one hand is used to grab the top handle elements 154 of the first device, then the other hand is used to grab an overlapping pair of handle elements of the first and second device. Likewise, in the case of the second rescue personnel 312, if the one hand is used to grab the bottom handle elements 154 of the second device, then the other hand is used to grab an overlapping pair of handle elements of the first and second device. Although not shown in the drawing, it is envisaged by the inventor to use the dome-like cover as a thermal blanket.

Figure 29:
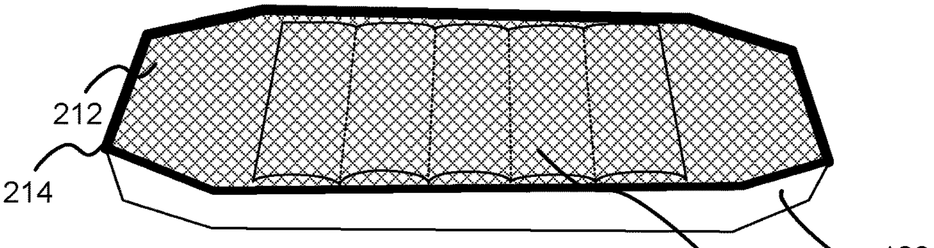
FIG. 29, in a back perspective view, illustrates a lumbar support bag.
Figure 30:
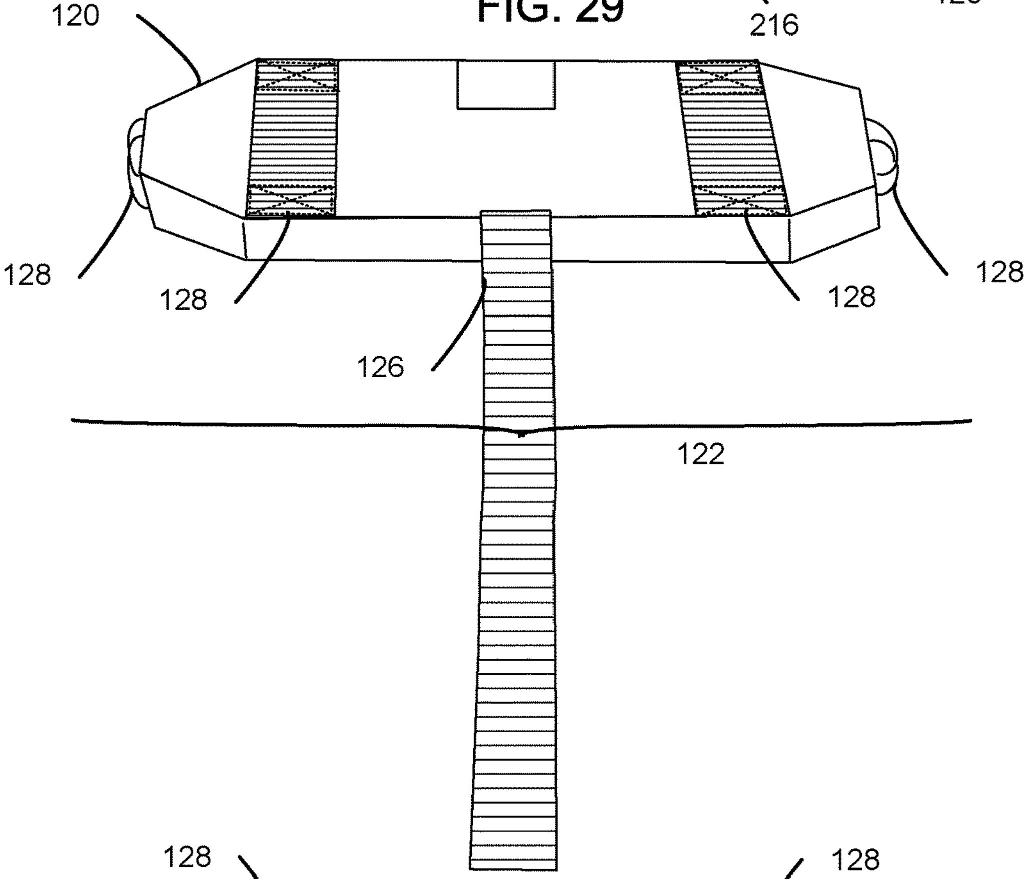
FIG. 30, in a front perspective view, illustrates the lumbar support bag of FIG. 29 in a closed state.
Figure 31:
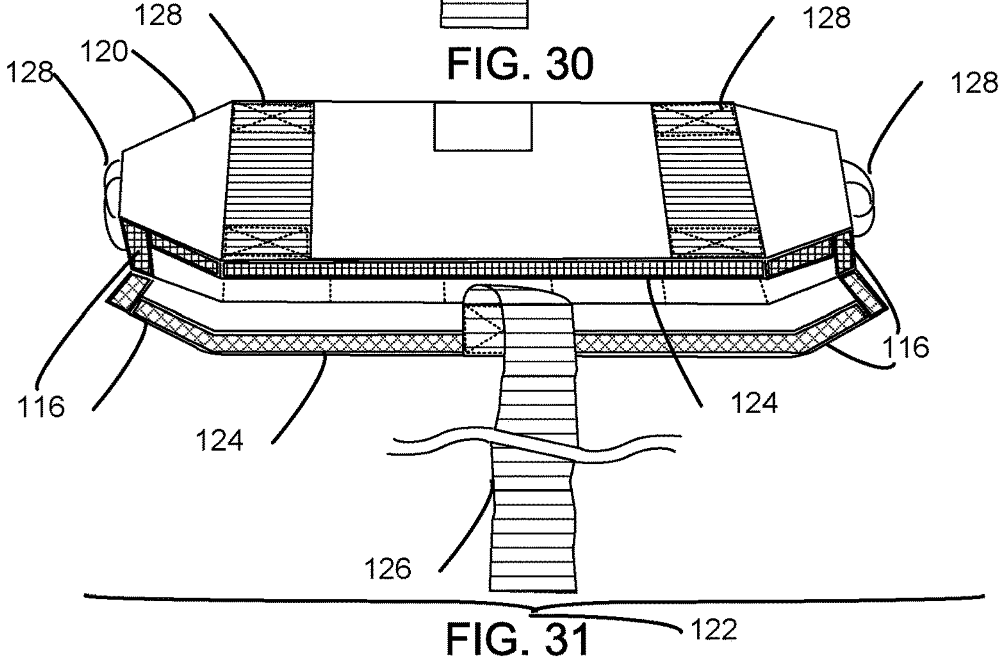
FIG. 31, in a front perspective view, illustrates the lumbar support bag of FIG. 29 in an open state.

FIG. 29, in a back perspective view, illustrates a lumbar support bag. FIG. 30, in a front perspective view, illustrates the lumbar support bag of FIG. 29 in a closed state. FIG. 31, in a front perspective view, illustrates the lumbar support bag of FIG. 29 in an open state. Referring to FIG. 29-31, in some embodiments, the device 100 further comprises a portable bag 120 for storing the cover 102. The bag 120 includes a re-closable bag opening structure 122. Furthermore, the bag opening structure 122 includes suitably configured complementary Velcro elements 116 extending along oppositely facing bag opening edges 124 thereof that are configured to overlap one another. The bag 120 is sufficiently sized and shaped for storing therein the cover 102 folded in a substantially compact state. In some embodiments, the bag opening structure 122 further includes at least one strap or string element 126. The strap element 126 has one end connected to an opening edge 124 of the bag opening structure 122. The strap element 126 is configured and sized for facilitating the opening of the bag 120 by pulling on the strap element 126. Preferably, the bag opening structure 122 includes one strap element 126. Further preferably, the pull strap element 126 has a length, width, surface texture and color that are suitably selected to facilitate locating the pull strap element 126 by sight or touch, grabbing and pulling on the latter's while the user 300 is in darkness and/or smoke filled conditions, so as to forcibly open the bag 120 and, thus, relatively quickly and easily gain access to the cover 102 independently of the surrounding conditions. Other known configurations for the pull strap element 126 are also possible for facilitating the opening of the bag 120. In some embodiments of the device 100, the bag 120 further includes at least one belt loop structure 128 connected to, or otherwise through, a surface portion of the bag 120 and is configured for removably engaging therethrough a portion of the user's 300 own belt element 130.

Advantageously, the back side of the bag 120 includes a lumbar support 212 for added comfort and support of the user 300, thereby increasing the likelihood that the device 100 will be worn by the user 300 at all times while on the job such that the device 100 will be available in the event that it is needed. The lumbar support 212 is generally covered with a mesh-like material that is breathable and long wearing. The edges 214 of the lumbar support 212 are provided with piping for added comfort. A plurality of lumbar support cushions 216 are provided parallel to it's width such that when the lumbar support 212 can be pressed onto the back of a user 300 and conforms to the users back by curving lengthwise, as will be further described in relation to FIG. 32.

Figure 32:
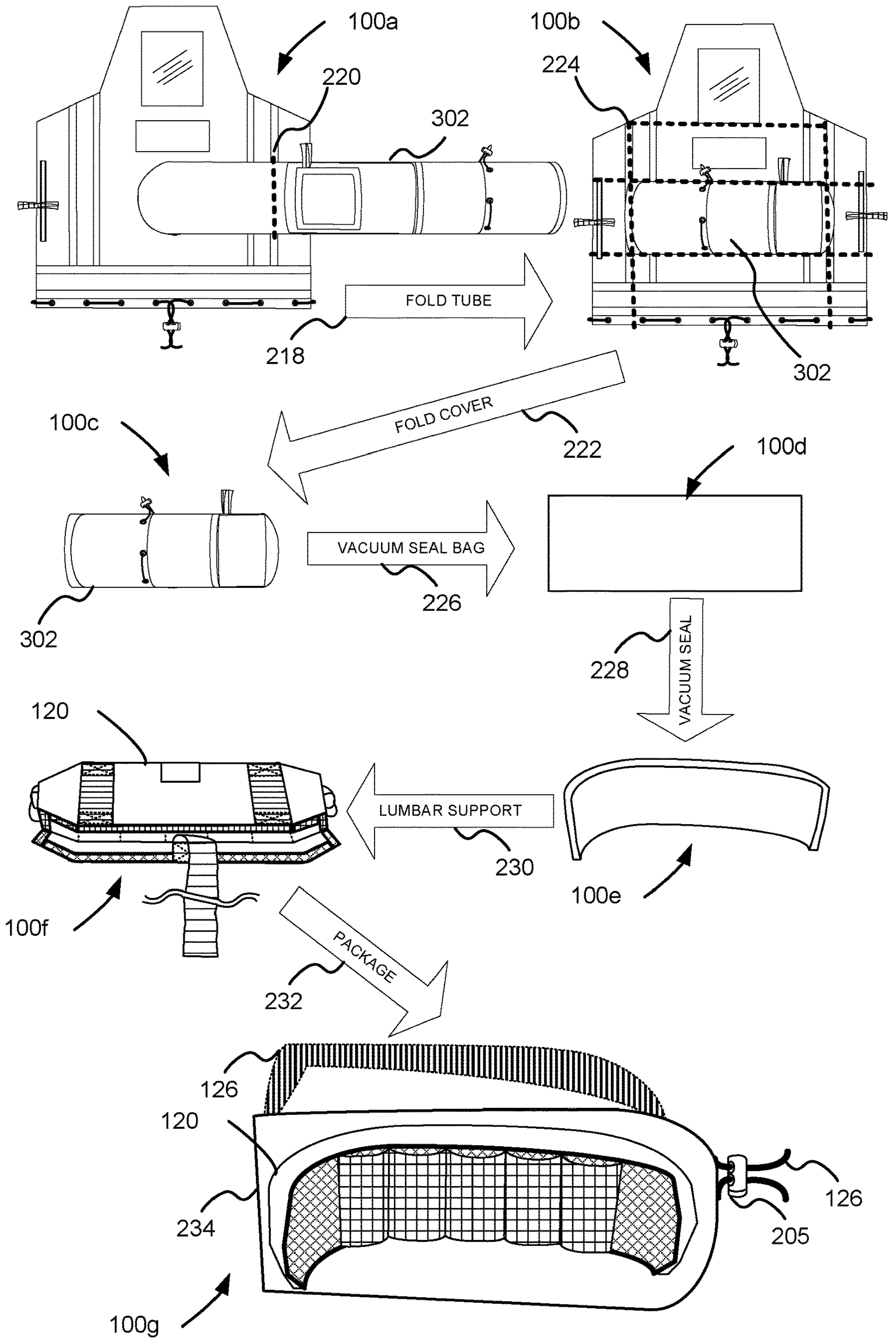
FIG. 32, in a flow chart view, illustrates folding and packaging the device of FIG. 20 to fit into the lumbar support bag of FIG. 29.

FIG. 32, in a flow chart view, illustrates folding and packaging the device of FIG. 20 to fit into the lumbar support bag of FIG. 29. Referring to FIG. 32, device **100*a* begins in an unfolded non-reversed position. After a first folding step, fold tube 218, device 100*a* is folded along a first predetermined line 220, for example to fold tube 302 to a dimension that fits into bag 120, resulting in device 100*b* at an intermediate folded position. After a second or more folding step, fold cover 222, device 100*b* is folded along one or more second predetermined lines 224, for example to fold cover 102 to a dimension that fits into bag 120, resulting in device 100*c* at a final folded position. At a vacuum seal bag step 226, the device 100*c* in a final folded position is inserted into a vacuum seal bag and results in a device 100*d* in a vacuum seal bag. At a vacuum seal bag step 228. The device 100*d* in a vacuum seal bag is vacuum sealed resulting in compact device 100*e*. The vacuum seal step should be timed to ensure that the resulting compact device 100*e* can be curved by manipulation without returning immediately to its flat shape, for example around 9 seconds using a conventional food vacuum sealing device. A person of ordinary skill in the art would have no trouble in adapting the timing of the vacuum seal step 228 given a particular vacuum sealing machine in view of this disclosure, such that any such variation is considered to be enabled, and therefore within the scope, by the present disclosure. At the lumbar support step 230, the compact device 100*e* is put into the lumbar support bag 120, and closed, resulting in a lumbar support configuration of the device 110*f*. At the package step 232, the lumbar support configuration of the device 100*f* is put into a packaging solution, such as a mesh bag 234 with strap 126, pull cord 126, and cord lock 205. Advantageously, the mesh bag 234 can be used by the user 300** to carry laundry to and from the job site. Furthermore, by vacuum sealing the device, a user is enabled to determine if the device has been used, or decide whether to inspect or replace the device if, for example, the vacuum seal is broken or the vacuum bag is missing.

Figure 33:
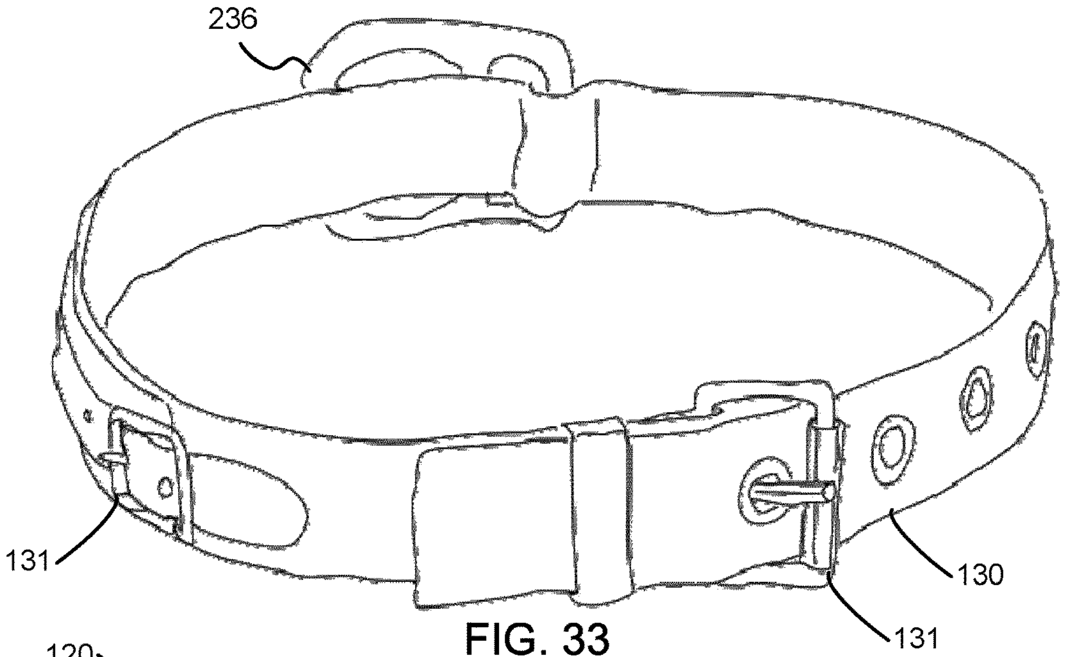
FIG. 33, in a front perspective view, illustrates a miner's belt.
Figure 34:
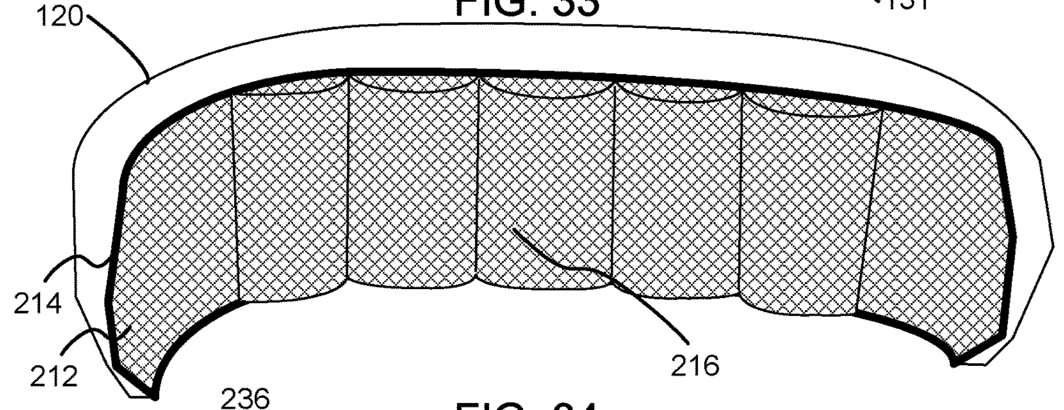
FIG. 34 illustrates, in a front perspective view, the lumbar support bag of FIG. 29 after the steps of FIG. 32.
Figure 35:
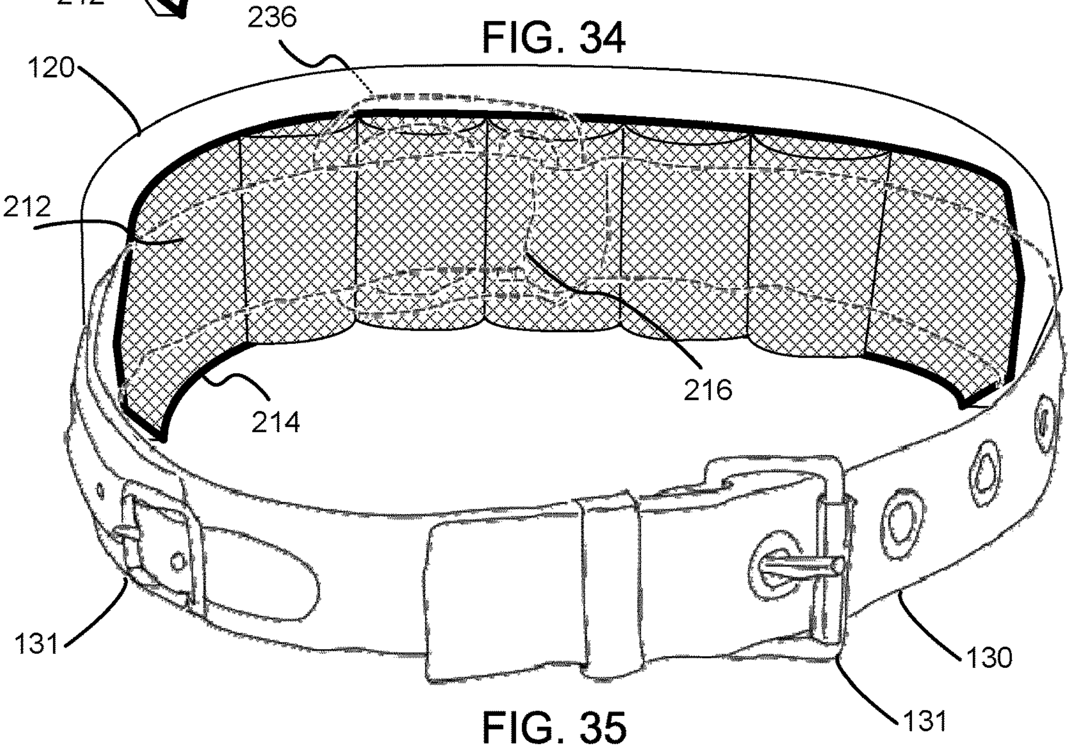
FIG. 35 illustrates, in a front perspective view, the attachment of the lumbar support bag of FIG. 34 onto the miner's belt of FIG. 33.

FIG. 33, in a front perspective view, illustrates a miner's belt. FIG. 34 illustrates, in a front perspective view, the lumbar support bag of FIG. 29 after the steps of FIG. 32. FIG. 35 illustrates, in a front perspective view, the attachment of the lumbar support bag of FIG. 34 onto the miner's belt of FIG. 33. Referring to FIG. 33-34, the miner's belt includes a main buckle **131*a* on the front, a secondary buckle 131*b* for a battery strap on the side, as well as a travel restraint D-ring 236 provided on the back. Advantageously, the D-ring 236 that is usually always present on a miner's belt for safety reasons, can be used to help pull the bag 120 around the user's 300 waist back and forth from a forward facing to a back support position. Bag 120 is provided with a lumbar support 212, including piping 214 and cushions 216 for added support and comfort. Further advantageously, as some miner's wear their belts on one side or another, it is simply a matter of inverting the belt 130 before inserting it into the belt loops 128 to wear the battery belt on the left side or right side without having to alter the design of the bag 120**.

As exemplified in the figure, there is shown the device in its bag 120 engaged through its belt loop structures 128 (see FIG. 29,30) along a miner's belt 130. Conveniently, the bag 120 storing the cover 102 may extend along a rear inner surface portion of the belt 130 for an enhanced comfort and lumbar support.

Figure 36:
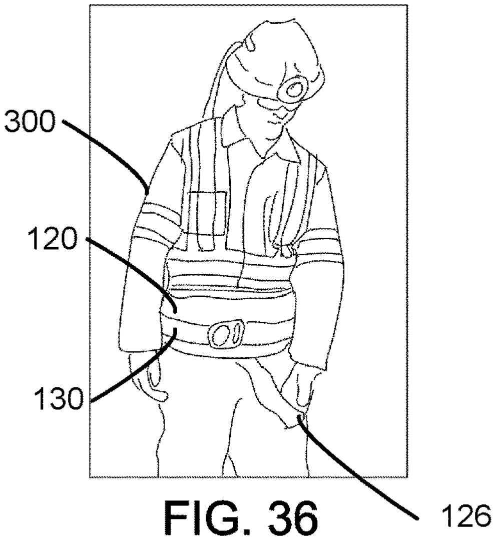
FIG. 36, in a front perspective view, illustrates a miner wearing the miner's belt and lumbar support bag of FIG. 35.
Figure 37:
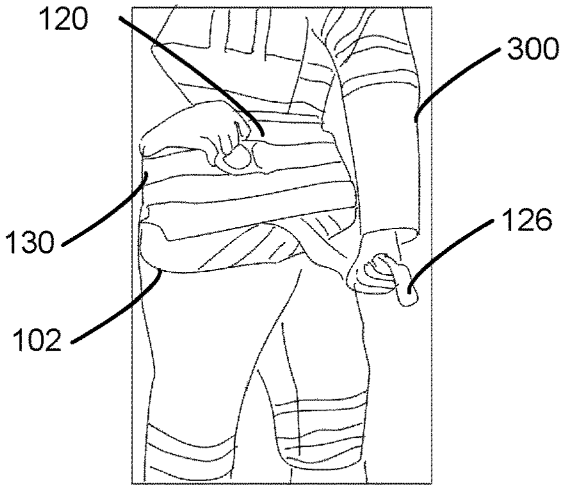
FIG. 37, in a front perspective view, illustrates the miner of FIG. 36 opening the lumbar support bag of FIG. 35 to access the device of FIG. 20 as folded by the steps of FIG. 32.
Figure 38:
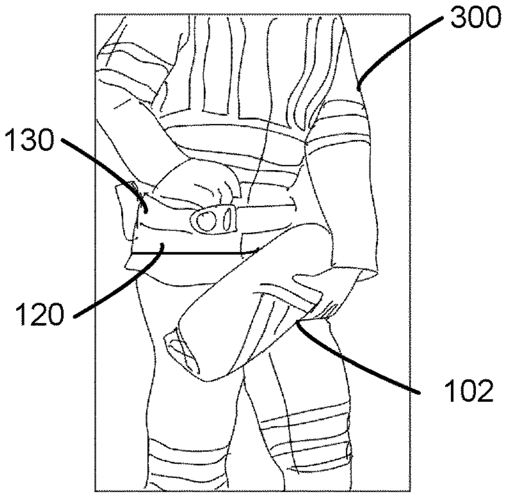
FIG. 38, in a front perspective view, illustrates the miner of FIG. 36, separating the folded device of FIG. 20 from the lumbar support bag of FIG. 35.
Figure 39:
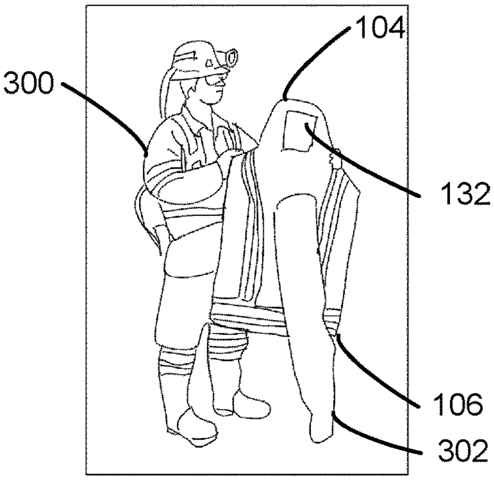
FIG. 39, in a front perspective view, illustrates the miner of FIG. 36, holding the device of FIG. 20 unfolded by performing the steps in reverse order of FIG. 32.
Figure 40:
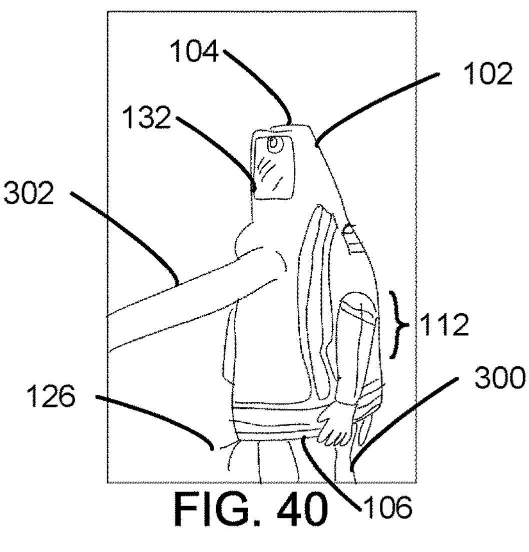
FIG. 40, in a front perspective view, illustrates the miner of FIG. 36, wearing the device of FIG. 20 connected to an oxygen source.
Figure 41:
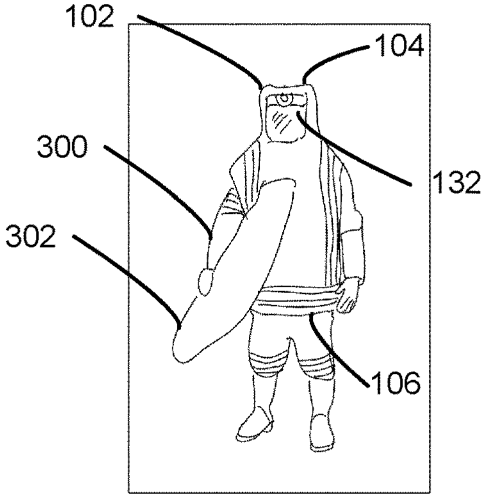
FIG. 41, in a front perspective view, illustrates an other miner ready to connect their device to the device of the miner of FIG. 40.

FIG. 36, in a front perspective view, illustrates a miner wearing the miner's belt and lumbar support bag of FIG. 35. FIG. 37, in a front perspective view, illustrates the miner of FIG. 36 opening the lumbar support bag of FIG. 35 to access the device of FIG. 20 as folded by the steps of FIG. 32. FIG. 38, in a front perspective view, illustrates the miner of FIG. 36, separating the folded device of FIG. 20 from the lumbar support bag of FIG. 35. FIG. 39, in a front perspective view, illustrates the miner of FIG. 36, holding the device of FIG. 20 unfolded by performing the steps in reverse order of FIG. 32. FIG. 40, in a front perspective view, illustrates the miner of FIG. 36, wearing the device of FIG. 20 connected to an oxygen source. FIG. 41, in a front perspective view, illustrates an other miner ready to connect their device to the device of the miner of FIG. 40 to share the oxygen source.

Referring to FIG. 36-39, a typical procedure to retrieve the cover 102 from the bag 120 thus engaged on a belt element 130 of the user 300 may consist in, first, slightly loosening the belt 130 along the waist, rotate the bag 120 to the front (e.g. by grabbing and pulling on D-Ring 236—see FIG. 35) and open the bag opening structure 122 (see FIG. 31) by pulling on strap 126 to retrieve the cover 102 there from. After unfolding the cover 102, the user 300 puts on the cover 102 ensuring that the window 132 and tubing 302 face forward, resulting in the head of the user being at the apex 104 of the inside 103 of the cover 102. The user 300 then passes his arms through the openings 112 and proceeds to connect the tubing 302 to a source of oxygen. The user 300 then cinches the cord 126 to achieve the desired fit such that when oxygen is received from the tubing 302, smoke is expelled at the bottom edge 106. Another user 300 (FIG. 41) can connect their tubing 302 to the tubing 302 of the first user 300 using the mechanism described above in great detail in relation to FIG. 22-23.

In some other embodiments of the device 100, the bag 120 further includes a waist belt 130 stitched, attached or otherwise integrated along a surface portion of the bag 120. The waist belt 130 may have any suitable type of buckle element 131 and is configured for allowing the user 300 to conveniently wear the device 100, for example, around the waist. Other types of belt 130 and buckle element 131 combinations are also possible. Thus, the device 100, generally including the cover 102, the bag 120 and the belt element 130, may be commercialised as a single product.

The above-described embodiments of the present application are intended to be examples only. Those of skill in the art may effect alterations, modifications and variations to the particular embodiments without departing from the scope of the application, which is set forth in the claims

What is claimed is:

1. A device for protecting a user from smoke or fire, comprising:

(a) a sealed dome-like cover defining a cover interior for receiving the user, a cover apex for receiving the user's head, a cover bottom edge distally opposite the cover apex, a cover front portion and a cover rear portion opposite the cover front portion;

(b) an opening provided in the cover front portion, sufficiently sized such that emergency oxygen received through the opening forces any smoke present under the cover to be expelled by positive air pressure through the space below the cover bottom edge;

(c) an integrated oxygen tubing having an elongate tubular structure whose proximal end is connected to the opening provided in the cover front portion, and whose distal end is provided with a distal opening to receive emergency oxygen that passes through the integrated oxygen tubing to the opening provided in the cover front portion; and (d) a closable lateral opening provided on the a side of the tubing such that when the lateral opening is open, air flows out of both the opening provided in the cover front portion and the closable lateral opening, and such that when the lateral opening is closed, oxygen flows only to the opening provided in the cover front portion, thereby enabling the selective sharing of an oxygen source by more than one user.

2. The device of claim 1, further comprising at least one ring provided between the proximal and distal ends of the integrated oxygen tubing for maintaining the tubing open.

3. The device of claim 2, wherein the at least one ring includes a distal ring provided at the distal end of the tubing and a lateral ring provided at the lateral opening, for facilitating the connection of another user of an other device to cooperatively share the same oxygen source through the insertion of a distal ring of the other device into the device's lateral opening.

4. The device of claim 1, further comprising a chamber in communication with the lateral opening and the inside of the tubing to aid in dividing the flow of oxygen when the lateral opening is open.

5. The device of claim 1, further comprising a draw string and a cord lock near the distal end of the tubing to seal the tubing to a source of oxygen.

6. The device of claim 1, further comprising a second dome-like cover connected with the first recited dome-like cover to share a same source of oxygen.

7. The device of claim 1, further comprising a plurality of reinforcement straps provided on the cover interior and four handles defining four apertures on the cover interior such that when the sealed dome-like cover is reversed, the handles can be used as a stretcher to carry a victim.

8. The device of claim 7, wherein the four handles are provided integrally with the plurality of reinforcement straps.

9. The device of claim 7, further comprising a second sealed dome-like cover reversed and with two of its four handles having apertures that coincide with two of the apertures of the four handles of the first recited dome-like cover, such that two rescue personnel can use two sealed dome-like covers as a single stretcher.

10. A method of use of the device of claim 9, the method comprising:

(a) placing the first recited reversed dome-like cover under the victim proximate to one of the head and the feet of the victim;

(b) placing the second recited reversed dome-like cover under the victim proximate to the other of the head and the feet of the victim;

(c) grabbing at least one of the handles of the first recited reversed dome-like cover and the second recited reversed dome-like cover to lift the victim; and (d) moving the victim to a safer location.

11. The device of claim 1, further comprising a bag for storing the cover, the bag including a front side, a back side, and a resealable opening for receiving the dome-like cover device.

12. The device of claim 11, further comprising at least one strap for opening the resealable opening when the strap is pulled.

13. The device of claim 11, further comprising at least one pair of hook and loop type fasteners provided in the resealable opening to facilitate opening and closing of the resealable opening.

14. The device of claim 11, wherein the bag is configured for removably engaging a waist belt of the user.

15. The device of claim 11, wherein the bag is configured to receive a miner's belt having a D-ring.

16. The device of claim 11, wherein the bag is configured to provide lumbar support.

17. The device of claim 16, wherein the back side of the bag includes a breathable mesh material.

18. The device of claim 16, wherein the back side of the bag has at least one support cushion.

19. The device of claim 16, wherein the back side of the bag has piping along its edge.

20. The device of claim 16, wherein the dome-like cover is folded in a compact fashion in order to provide an adjustable curvature to the lumbar support when the dome-like cover is inserted into the bag.

21. The device of claim 20, wherein the dome-like cover is provided in a vacuum sealed bag rendering the dome-like cover malleable to conform to the curvature of the user's back.

22. A method of manufacture of the device of claim 21, the method comprising a step of vacuum sealing the vacuum seal bag for a predetermined amount of time.

23. A method of use of the device of claim 16, the method comprising a step of wearing the bag of the device as a lumbar support.

24. The device of claim 1, wherein the dome-like cover includes a window made of flexible, transparent and fire resistant material located at eye level of a the user when under the dome-like cover.

25. The device of claim 1, wherein the dome-like cover is made of a flexible and fire resistant material.

26. The device of claim 1, further including an air filter.

27. The device of claim 1, further including an LED strip.

28. The device of claim 27, further including a power circuit connected to the LED strip.

29. A method of use of the device of claim 1, the method comprising:

(a) overlaying the dome-like cover over the user from above the top of the head of the user to at least the waist of the user;

(b) connecting the opening provided in the front cover portion to a source of oxygen; and (c) sharing the source of oxygen with another user having an other device provided by claim 1.

* * * * *